(12) United States Patent
Yee et al.

(10) Patent No.: US 6,738,975 B1
(45) Date of Patent: *May 18, 2004

(54) EXTENSIBLE DISTRIBUTED ENTERPRISE APPLICATION INTEGRATION SYSTEM

(75) Inventors: Hon-Siew Yee, Herndon, VA (US); John Timothy Taylor, Leesburg, VA (US)

(73) Assignee: Software AG, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,596

(22) Filed: Oct. 5, 1999

Related U.S. Application Data

(60) Provisional application No. 60/108,993, filed on Nov. 18, 1998.

(51) Int. Cl.[7] .......................... G06F 15/163; G06F 9/00; G06F 9/54
(52) U.S. Cl. ....................................... 719/310
(58) Field of Search ......................... 709/310

(56) References Cited

U.S. PATENT DOCUMENTS

| | | | |
|---|---|---|---|
| 5,524,253 A | * | 6/1996 | Pham et al. ............... 709/202 |
| 6,370,590 B1 | * | 4/2002 | Nitz et al. ................. 709/317 |
| 6,453,356 B1 | * | 9/2002 | Sheard et al. ............. 709/231 |
| 6,507,875 B1 | * | 1/2003 | Mellen-Garnett et al. ... 709/310 |

\* cited by examiner

*Primary Examiner*—Thomas Lee
*Assistant Examiner*—Diem Cao
(74) *Attorney, Agent, or Firm*—Venable LLP; James R. Burdett; Daniel G. Vivarelli, Jr.

(57) ABSTRACT

In general, in one aspect, the invention provides a modular application collaborator for providing inter-operability between applications including a plurality of connectors for communicating with a like plurality of applications and an interchange server. The interchange server includes an application collaboration module and service module. The service module transfers messages between connectors and the application collaboration module. The application collaboration defines the inter-operability between two or more applications. The interchange server service module includes a transaction service and an error service. Transactions are executed in the application collaboration module and the transaction service records each action and a compensating action for undoing an associated action. An error service monitors for errors in the interchange server, and, upon detection of an error, stops the execution of a transaction and initiates the execution of any required compensating actions to undo the interrupted transaction. The compensating transactions may be executed at the connectors and are not required to be overseen by the interchange server.

26 Claims, 10 Drawing Sheets

EXTENSIBLE DISTRIBUTED ENTERPRISE APPLICATION INTEGRATION SYSTEM

CROSS-REFERENCE TO RELATED APPLICATIONS

This application is related to provisional patent application Serial No. 60/108,993, filed Nov. 18, 1998, the contents of which are incorporated herein by reference.

This application is also related to the following, commonly assigned patent applications filed concurrently herewith: Ser. No. 09/412,595, now U.S. Pat. No. (6,256,676 B1) for an "Agent-Adapter Architecture for Use in Enterprise Application Integration, Systems", and Serial No. 09/412,633, now abandoned, for a "Message Object for Use in Enterprise Application Integration Systems", both of which are incorporated herein by reference.

COPYRIGHT NOTICE

Portions of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related generally to what has become known in the computing arts as "middleware", and more particularly to a unique agent-adapter architecture used in systems and methods to integrate applications of the type normally deployed across a networked enterprise.

2. Statement of the Prior Art

According to one observer, if the lifeblood of today's corporations is information, then their arteries are the "inter-application interfaces" that facilitate movement of data around the corporate enterprise. This has more recently become known as an "application network".

For the typical organization, the application network has grown organically into a collection of ad hoc application integration programs. This menagerie has had a very serious impact on businesses as it increases the time for implementing new applications, prevents senior management from getting a clear picture of the business and, in short, clogs the corporate arteries. In spite of the fact that application integration has become crucial to a competitive corporation's survival, it has nevertheless been acceptable in the prior art to handcraft or "hack" custom code for such purposes at enormous long-term cost to the corporation. Long-term application integration decisions have, likewise, been made at the lowest possible levels based solely on individual project criteria. Because of the decidedly difficult nature of these problems, an effective enterprise application integration (EAI) solution has yet to be found.

The advent of the Internet, client/server computing, corporate mergers and acquisitions, globalization and business process re-engineering, have together forced corporate information technology (IT) departments to continually seek out new, and often manual, ways to make different systems talk to each other—regardless of how old some of those systems may be. In the ensuing chaos, inadequate communications systems have had a debilitating effect on IT's abilities to move as fast as the business needs it to.

Recent trends in IT have only exacerbated this problem by increasing—often by an order of magnitude—the amount of inter-application interfacing needed to support them. Most recently, enterprise applications have performed such functions as data warehousing and enterprise resource planning (ERP), and facilitated electronic commerce. A brief review of these three technologies would, therefore, be helpful in understanding the long-felt but as yet unresolved need for EAI.

Data warehousing techniques require large volumes of clean historical data that must be moved, on a regular basis, from many operational systems into the warehouse. Source data is usually structured for online transactional processing (OLTP), while the typical data warehouse also accommodates online analytical processing (OLAP) formats. Therefore, the source data must undergo extensive aggregation and reformatting as it is transferred to the warehouse.

A typical data warehouse according to the prior art is populated in four steps: (a) extracting the source data; (b) cleaning such extracted data; (c) aggregating the cleaned, extracted data in a number of dimensions; and (d) loading the warehouse. Each warehouse source requires the building of a specific data extraction, cleansing, aggregation, and load routine. Forrester Research estimates that the average large company has approximately four data warehouses. In two years, it is expected that this number will grow to six. The average amount of data contained in each warehouse is also expected to double in size in that same period—from about 130 gigabytes to about 260 gigabytes.

The problems associated with such large amounts of data growing at an ever-increasing pace is exacerbated by the quality of source data. According to a study conducted by the META Group, typical data warehouses are being loaded today with as much as 20% poor quality data. That same study indicates that about 70% of its respondents used extraction, cleansing and loading processes that were coded by hand. With respect to the required aggregation processes, anecdotal evidence also reveals that as much as 50 hours of computer time may be required to complete this function alone. It is readily apparent that significant maintenance efforts would be involved with programs coded in such a manner.

On the other hand, typical ERP systems (such as the R/3 enterprise application developed by SAP AG of Walldorf, Germany, as well as those developed by PeopleSoft, Oracle, and Baan) are essentially large, integrated packaged applications that support core business functions, such as payroll, manufacturing, general ledger, and human resources. Large corporations find it particularly attractive to buy such software solutions from a single source, since it can cost between 10 to 20 times more to develop the same functionality in-house than to purchase it. Implementing an ERP system, however, can be an overwhelming process for a number of reasons.

First and foremost, the corporation is buying a product and not building a solution. This means that business units within the corporation must adapt to the product and how it works, not the other way around. Furthermore, today's ERP systems cannot replace all of a corporation's custom solutions. They must, therefore, communicate effectively with other legacy systems in place. Finally, it is not atypical for a corporation to employ more than one and completely different ERP system because a single vendor cannot usually meet every organizational need.

As a result, the options for getting data into and out of an ERP system preclude known approaches used for data warehousing. Each ERP system has a proprietary data model that is constantly being enhanced by its vendor. Writing extract or load routines that manipulate such models is not only complicated, but is also discouraged by the vendor since data validation and business rules inherent in the enterprise application are likely to be bypassed. Instead, ERPs require interaction at the business object level which deals with specific business entities such as general ledgers, budgets or accounts payable. Further details regarding implementation and use of one well-known and widely accepted ERP system may be found in *Special Edition Using SAP R/3* (2d ed.), ISBN: 0-7897-1351-9, by Que Corporation (1997), the contents of which are incorporated herein by reference.

Electronic commerce in one form or another has been around for many years. In essence, it got its start with electronic data interchange (EDI). EDI permitted companies to communicate their purchase orders and invoices electronically, and continued to develop such that today's companies use EDI for supply chain management. However, not until the more recent exploding use of online Internet websites to buy, sell, and even auction, items of interest has there been such a dire need for robust, effective EAI. See, e.g., U.S. Pat. No. 5,627,972.

Applications get developed in order to accomplish a specific business objective in a measured time frame. In a typical large organization, different teams of people using a wide assortment of operating systems, DBMSs and development tools develop hundreds of applications. In each case, the specific requirements are satisfied without regard for integration with any other applications.

Several powerful trends are driving the market for application integration. For example, significant developments in peer-to-peer networking and distributed processing have made it possible for businesses to better integrate their own functional departments as well as integrate with their partners and suppliers. The aforementioned Internet/"intranet"/ "extranet" explosion is also fueling the demand for a new class of "human active" applications that require integration with back-end legacy applications. Tremendous growth around the world in the adoption of enterprise application software packages (e.g., SAP R/3) also requires integration with back-end legacy applications. Finally, message oriented middleware (MOM)—products such as IBM's MQSeries message queuing product—are becoming increasingly popular. Once customers realize the benefits of simple one-to-one application connectivity with MOM, their interest in many-to-many application integration increases significantly.

As the need for businesses to integrate grows, the number of IT dollars spent on integrating applications is increasing rapidly. According to various industry analysts, the need for "mission critical" application integration will drive the combined market for MOM and "message brokers" to grow from $300 million in 1997 to over $700 million in 1999. According to an IBM survey of larger customers, nearly 70% of all code written today consists of interfaces, protocols and other procedures to establish linkages among various systems. Savvy IT executives can clearly see the dollar savings to be gained by acquiring off-the-shelf software to satisfy as much of this requirement as possible.

A message broker is a software hub that records and manages the contracts between publishers (i.e., senders) and subscribers (i.e., receivers) of messages. When a business event takes place, the application will publish the message (s) corresponding to that business event. The broker reviews its lists of subscriptions and activates delivery to each subscriber for that message type. Subscribers receive only the data to which they subscribe. A message published by one application can be subscribed to by multiple consumer applications. Similarly, a subscribing application can receive messages from multiple publishing applications.

Before applications can publish or subscribe to messages, they must register their interest with the broker. There are two basic and different methods for applications to register interest in a message type—subject-based addressing and message-content filtering. In subject-based addressing, the broker uses the subject to identify and route the message to all parties expressing interest in that subject. The subject is a word used to describe the contents of the message. For example, a subject of the name "hr. emp. new," could serve to distribute information (name, address, employee number, etc.) on a newly hired employee. In message content routing, on the other hand, subscriptions are made based on the contents of fields within the message. The subscriptions can be based upon the message type and/or specific selection criteria relative to a field within the message. For example, a loan approval application could subscribe to all purchase orders over $100,000.

One advantage to having two publish/subscribe paradigms is that the need to address messages to individual subscribing applications is avoided. Additionally, new subscribing applications can be added without any changes to the publishing application.

The typical publishing/subscribing broker uses a robust delivery vehicle for the actual distribution of messages between applications. As mission critical messages travel over a combination of external and internal networks, the systems software ensures that messages are never lost or duplicated in the event of network failures. More often than not, an asynchronous message delivery capability is provided which uses store-and-forward message queuing. In this paradigm, the queue-to-queue transfer takes place in pseudo-real time when the subscribing application is available. If the subscribing application is unavailable, the message is stored in a persistent queue for later delivery.

To be effective, the message delivery vehicle must include a business transaction coordination function. A business transaction is typically made up of several units of work. Each and every unit of work must complete in order for the transaction to occur. If even one unit of work fails, the whole transaction fails, and all completed units of work must then be reversed. These transactions are long running and require message-based updates to multiple databases. The business transaction coordination function provides this managerial support.

Two other important components are the rules-based engine and the data-transformation component. The business rules engine allows organizations to process messages based upon the unique requirements of their business. Typically, business rules engines provide a visual front end to avoid the need for programming in a procedural language. With this flexible approach, changes in business processes can be easily reflected in a modified rules configuration.

The data transformation component is used to develop application-specific adapters. These adapters convert the data formats and applications semantics from the sending application to the receiving application. There are many conversion requirements. They range from basic data transformation to resolving the incompatibilities that exist between the structure (syntax), meaning (semantics) and timing of the information that must be shared.

There are two main strategies for application adapters according to the prior art. One strategy is to convert all of the source data and synchronize (or "sync") applications to a standard canonical form. Messages move from the source adapter to the sync adapter in this standard form. At the sync adapter, the messages are converted to the format of the sync application.

The second strategy for application adapters is to automatically convert the format and semantics from the sending application to the receiving application in one step, without any intermediate formats. In this approach, only one adapter is required for two applications to communicate with each other and it can be integrated with either of the applications.

The rules based engine and the data transformation component work together to reconcile the differences between applications. For example, before two applications can be integrated around an order, the business rules regarding the processing of orders must be defined within each system. Within Application "A," an order might be comprised of a collection of data from multiple files and databases; whereas within Application "B," an order might exist as an individual message nested within a larger file of business transactions. The difficult challenge is to resolve the incompatibilities between the structure of the data and the underlying content of an order as defined in each application.

There are a number of potential business benefits that message brokering provide. First of all is their ease of application integration. With message brokers, the integration of new applications with existing legacy or third-party applications can be performed in a shorter period of time. The integration can take place without any need for understanding the internal structure and design of each application. By focusing on the interface as messages, existing applications can be integrated with minimal disruption.

Support for electronic commerce is a second benefit that message brokering provides. As businesses begin to automate the supply chain of their vendors and partners, there is a need for their independent applications to communicate in a loosely coupled manner. This is precisely the essence and strength of message brokering. The message broker is completely congruent with the business need.

Last, but certainly not least, is message brokering's support for continued heterogeneity. As new technology has evolved, new architectures have been developed and heterogeneity is increasing over time. A methodology such as message brokering is designed to accommodate today's heterogeneous world and will be useful in the future. New, differing applications can be added over time as either publishers or subscribers, without any changes to the existing applications in the message broker.

In summary, message brokers have the potential to provide a least-common-denominator approach to integrating heterogeneous applications within an enterprise. Users can choose the best technology for each individual application whether JAVA, ACTIVE X, or CORBA, without concern for how that application will integrate with other applications in the enterprise. Message brokers thereby bridge the gap between applications of the future and the disparate and complex products and technologies that currently exist in today's application catalogues.

While there are many benefits to adopting a message broker strategy, it must be kept in mind that there are also potential pitfalls. The very strengths of the message brokering in terms of its loose coupling flexibility, may also be its greatest weakness. The nature of message broker software, as noted above, is very generalized. Because it is designed to handle so many different conditions, testing all possible end-to-end code paths is an insurmountable task. When undetected bugs exist in the software, messages may be lost, delivered twice or delayed. The damage from such "accidents" would be most keenly felt in enterprises where message brokers are used to integrate mission critical transaction processing applications. In financial transactions, for example, the delivery of one single message could be worth millions of dollars; while at the same time its non-delivery or delayed delivery could result in the loss of millions.

A second risk to a message broker implementation is the possibility that foreign applications will introduce unauthorized messages to the broker. This may also result in loss. For example, in the banking industry, counterfeit messages could be published and thereby cause the withdrawal or misappropriation of funds.

A third risk of message broker implementation is the classical, "single point of failure." Message brokers of the prior art are typically implemented in a "hub and spoke" architecture. This means that the majority of message traffic passes through a few central hubs. In the event of an outage or a physical disaster to one of those hubs, the mission critical operations of a business could come to a grinding halt.

Another problem with distributed hubs is the difficulty of managing the message broker complex. Because a message broker integrates so many different business applications into a few consolidated hubs, the talent and expertise required to manage and administer a message broker complex may be unattainable.

The potential risk exposure is large whenever technology is applied to mission critical transaction processing applications of an enterprise. One problem for message brokering is that it manipulates mission critical information. In relative terms, message brokering is fairly new. However, while some early adopter companies have had great success with the concept of message brokering, much more is needed before message brokers and EAI can enter the mainstream.

In the 1980's software systems development concentrated on the ability of heterogeneous systems to communicate with each other. This was, in large part, due to the proliferation of proprietary communication protocols. Any newly developed system had to either comply with the application and data formats in place for the systems with which it wished to connect or communicate, or provide such application a specific translation. Accordingly, all software was customized to a greater or lesser degree.

In today's rapidly changing environment, the concerted efforts of thousands of developers worldwide are focused on developing a system that satisfies the need for disparate applications to communicate with each other, without the necessity of embedding multiple, customized application-specific translation schemes. This as yet unfulfilled need is grounded in the imperative of the global economy.

SUMMARY OF THE INVENTION

Definitions

The following terms should be construed by those of ordinary skill in the art in accordance with their ordinary and accustomed meaning. To the extent the definitions, which appear herein below, differ from otherwise conventional definitions that may be known to those of ordinary skill in the art, it should be appreciated that such terms are hereinafter clearly set forth in such a manner to put one reasonably skilled in the art on notice that the applicant intended to so redefine that claim term.

An "accessor" is a function specified in message definitions that the system uses to access data. Accessors identify the start and end of application data fields and system message elements, and remove or insert markers.

"Adapter implementations" are code designed for a specific application that can either extract data and produce system messages, receive system messages and update data, or extract data in response to requests. When the user creates an adapter to use in an integration flow, the user builds it around an adapter implementation. System adapter implementations provide basic exception handling and can handle any message definition. The user can create the user's own custom adapter implementations using the ADK.

"Adapters" are integration flow objects that interact with enterprise applications to extract data or insert, update, or delete data.

The "administration console" is a graphical user interface (GUI) through which a system administrator configures and manages the system's nodes and services.

"Agent services" provide system services to the adapters. An agent service is required on each host that runs an adapter.

A "classpath" is an environmental variable that tells the Java virtual machine where to find the class libraries, including user-defined class libraries.

"Clients" are processes that remotely access computer server resources, such as compute power and large memory capacity. Typical system clients are the integration workbench 120 and the administration console 160.

A "connection" is an object that specifies startup or connection parameters for adapters. For example, an RDBMS connection specifies the JDBC driver, the URL of the database, the user name, and password.

"Convert" data is a process in which converters specified in message definitions convert an application's native data types to the Java data types the system supports, and vice versa.

A "converter" is a function specified in message definitions that the system uses to convert data. In such a manner, converters convert native data types to the Java data types that the system supports, and vice versa.

"Custom adapter implementations" are code designed for a specific application that can either extract data and produce system messages, receive system messages and update data, or extract data in response to requests. Custom adapter implementations, created using the ADK, can connect to applications the system does not currently support.

A "definition object" is an integration flow object that provides instructions for a process that the system is to implement.

"Delimiters" are tokens or markers that separate data fields in data from enterprise applications.

A "durable subscription" is a property of the system's message hubs that ensures the hub target objects receive all messages intended for them. If a target object becomes inactive, the system remembers those messages, which the target has received. When the target next becomes active, the system delivers messages the target has not yet received.

"Enterprise applications" are applications from which adapters extract data or to which adapters propagate data (e.g., SAP R/3 or MQSeries).

An "Enterprise Messaging Service (EMS)" according to the present invention is implemented using the Java Messaging Service (JMS). It enables the system to use multiple messaging modes, and supports message hubs and provides message persistence.

"Enterprise Resource Planning (ERP)" applications provide a turnkey solution (e.g., warehouse management, human resource management, and materials management) for common business problems. Examples of ERP products are SAP R/3, PeopleSoft, and Baan.

An "EntireX Broker (ETB)" is a cross-platform, message-oriented middleware according to the present invention, which links mainframe, Windows NT, and UNIX applications and components, Internet and intranet clients, and ActiveX- and Java-enabled workstations.

"Filter definitions" are definition objects that specify criteria for screening messages out of integration flows.

A "functions host" is a computing platform, such as a Windows NT server or workstation, or OS/390 mainframe.

"Hubs" are integration flow objects that receive messages from source objects and hold the messages until the system delivers them to specified target objects. Hubs allow adapters and transformers to exchange messages asynchronously. They are also useful for concentrating message flows; multiple objects that produce the same kind of message can all send those messages to one message hub, which simplifies links among objects An "IDoc Extractor" reads flat files produced by the SAP R/3 transaction WE63 to create implementation configurations and message definitions and stores them in the the system's repository service.

"Implementation settings" are runtime parameters for adapters (e.g., a polling interval).

An "integration flow" is a series of linked system objects that move data from one or more enterprise applications to other enterprise applications.

"Integration objects" are integration flow objects, which send messages, receive messages, or both. See, e.g., adapters, hubs, and transformers.

An "integration workbench" is a graphical user interface (GUI) through which a user designs integration flows.

"Intermediate documents (IDocs)" is an SAP R/3 data format used by R/3 to exchange data with other R/3 systems and with other applications.

An "item message element" is a message element that contains data. Items are the lowest level message elements in the hierarchy of the message definition. They cannot contain other message elements.

"Java Database Connectivity (JDBC)" is the Java API standard for SQL-based database access.

A "Java Development Kit (JDK)" is a software development environment for writing applications in the Java programming language.

"Java Message Service (JMS)" is a Java API specified by Sun Microsystems for messaging.

A "Java Naming and Directory Interface (JNDI)" is a set of APIs that assist with the interfacing to multiple naming and directory services.

"Java Runtime Environment (JRE)" is a subset of the Java Development Kit used to redistribute the runtime environment consisting of the Java virtual machine, Java core classes, and supporting files.

A "Java virtual machine (JVM)" is part of the Java Runtime Environment responsible for interpreting bytecodes.

"Link markers" are tokens or delimiters that separate data fields in data from enterprise applications.

A "message definition category" is a logical grouping for message definitions.

"Message definitions" are definition objects, which identify data the system is to extract from or propagate to an enterprise application. Message definitions also define how the system is to construct system messages from enterprise application data or create enterprise application data from system messages.

A "message element" is a data object that makes up the message schema of a message definition. Message elements are arranged in a hierarchical structure, and can be sections, tables, or items.

"Message-Oriented Middleware (MOM)" is software that uses messages to enable applications on the same or different platforms to communicate. Communications protocols are hidden from the applications. Examples of MOMs are MQSeries, EntireX Broker, and JMS.

"Message persistence" relates to the storing of messages onto recoverable media. The system writes each message it delivers from one integration object to another to stable storage in a location the user specifies. If a system failure occurs while a message is in transit, the system can retrieve the message from storage when the system is restored and deliver the message to its targets.

A "message schema" is that part of message definitions, which define how to structure a message. Message schemas can include section, table, and item message elements arranged in a hierarchical structure.

"Monitor services" store system runtime data, including system logs and statistics information.

A "node" is a physical process (or Java virtual machine) that supports one or more system and application services.

"Node hosts" are software than enables the user to configure and run nodes on a machine. The user must install a node host on every machine, other than the node manager, that will host a node.

A "node manager" is an interface through which nodes are managed. The interface allows the user to configure, start, pause, or stop a service. Node managers start and stop nodes as well. The node manager maintains the state of all of the services that are distributed to the nodes. In addition, the node manager maintains status information (e.g., current state or activity level) of a node or service.

"Point-to-point messaging" is a messaging style for hubs in which the system delivers each message that arrives at the hub to a single hub target only (i.e., the first available target.

A "primary input message" is the main input data to the system transformation processes specified in transformer definitions. The system takes input data, transforms it, and creates output data needed by target applications.

"Publish/subscribe messaging" is a messaging style for hubs in which the system delivers each message that arrives at the hub to all hub targets.

A "replier" is a system object, such as a reply adapter, which provides data when transformers request it during the data transformation process.

"Reply adapters" are integration objects that reply to requests for data from other integration objects by extracting the data from applications and sending it to the requesting objects. Requesters send system messages containing data in key message elements, and the reply adapters insert data into related message elements and send the system messages back.

A "repository service" is interfaced via Java Native Directory Interface, and stores configurations for all configured services and integration flow objects.

"Routing services" enable the system to direct messages through the system based on a message's content, including filtering message content according to criteria the user define. The routing service supports filters.

A "system message" is a message, in platform-neutral format, that the system uses to move data from application to application.

"Section message elements" are non-repeating groups of message elements that do not contain actual data. They contain other message elements that contain data (i.e., they contain items). Sections can contain any combination of message element types.

A "service" is a process that provides product functionality. The system is made up of system, messaging, integration, and agent services.

"Source adapters" are integration objects that extract data from enterprise applications, construct system messages from the data, and send the messages to other the system integration objects.

A "source object" is an integration flow objects that provides messages to other objects. See, e.g., source adapters, transformers, and hubs.

"Supporting input messages" are optional input data to the system transformation processes, as specified in transformer definitions. Transformation processes use supporting input message data to supplement primary input message data. The system takes input data, transforms it, and creates output data needed by target applications.

A "table message element" is a group of section message elements, called rows, that can repeat any number of times. Table elements do not contain actual data. Instead, they contain other message elements that contain data (i.e., they contain items). Tables can contain any combination of message element types.

"Target adapters" are integration objects that receive system messages from other integration objects, create application data from the system messages, and propagate the data to target applications.

A "target integration object" is an integration flow object that receives messages from other objects. See, e.g., target adapters, transformers, and hubs.

"Transaction Processing Monitor (TPM)" is a software system designed to optimize use of computing resources, such as storage and applications, for many users.

To "transform data" is a process in which transformers modify data taken from one or more enterprise applications into data needed by other enterprise applications.

"Transformation services" enable the system to transform messages, including splitting messages, combining messages, and manipulating message data. The transformation dervice supports transformers.

A "transformation step" is a command that makes up the transformation process. Each step either reads input message data, transforms and maps input message data to output message definitions, or writes transformed data to output messages.

"Transformer definitions" are definition objects that define how the system is to transform system messages extracted from one or more enterprise applications into system messages needed by other enterprise applications.

A "transformer" is an integration object that implements transformer definitions. Transformers gather input messages from source integration objects, transform the content and format of the message data, and produce and send output messages to target integration objects.

"User interface services (UIS)" provide the user interface facilities necessary to run the client components (i.e., the integration workbench 120 and the administration console 160).

OBJECTS OF THE INVENTION

Accordingly, it is a general object of the present invention to provide systems and methods for integrating enterprise applications, which at the same time provide comprehensive management, including centralized monitoring, operation and configuration.

It is a more specific object of the present invention to provide for improved message tracking and manipulation in such systems and methods.

Another object of the present invention is to provide enhanced security in such systems and methods, covering such aspects as authentication, authorization, privacy, non-repudiation, and auditing.

Still another object of the present invention is to provide systems and method for integrating enterprise applications that include means for disaster recovery, fail-safe rollover, message replay and dual-site logging.

It is also an overall object of the present invention to facilitate fast and simple integration of leading ERP applications, custom/legacy applications, packaged applications, and databases. More specifically, it is also an object of the present invention to reduce or substantially eliminate the need for the expensive custom coding that is traditionally required to integrate applications.

Another object of the present invention is to provide an EAI system with a distributed architecture that facilitates the long-term reliability, scalability, flexibility, and extensibility needed by today's enterprises.

Still another object of the present invention is to provide an EAI system which increases an enterprise's return on investment by enabling the enterprise to leverage its existing IT investments, increase its speed to market, implement solutions and realize benefits more quickly, and reduce its operational costs.

Yet another object of the present invention is to provide an EAI system which provides faster access to an enterprise's customer and billing information so that the enterprise can service its customers more effectively and efficiently, creating stronger, more effective relationships.

A further object of the present invention is to provide an EAI system with many-to-many points of integration that substantially eliminates the concerns of conventional hub-and-spoke systems and their single-point-of-failure risks.

Still a further object of the present invention is to provide an EAI system, which simplifies the enterprise IT, architecture by providing a central point of integration for virtually all applications and platforms.

Yet a further object of the present invention is to provide an EAI system which provides efficient and cost effective information sharing.

The methods, apparatus, and articles of manufacture described herein will achieve the above and other objects, advantages, and novel features according to the present invention, while avoiding the problems described herein above.

In accordance with a first important aspect of the present invention, the method comprises computer-implemented means for passing messages between a first computer application and a second computer application. Such method generally includes the steps of: (a) providing a first message having a first data structure from the first computer application; (b) publishing the first message to obtain a first published message; (c) converting the first data structure of the first published message to a second data structure to obtain a second message; (d) publishing the second message to obtain a second published message; and (e) providing the second published message to the second computer application.

According to a second important aspect of the present invention, the apparatus comprises a system for integrating a plurality of computer applications. Such apparatus generally includes means for routing messages within the system; means for storing a plurality of data transformation configurations and a plurality of rules; means for applying the data transformation configurations to messages; means for applying the rules to messages; and means for routing messages between the means for routing messages within the system and the computer applications and having dedicated means for routing messages for respective computer applications.

Alternatively, the apparatus of the present invention comprises a system for integrating a plurality of computer applications. Such system generally includes an enterprise messaging system that passes messages between the computer applications; a database storage system, coupled to the enterprise messaging system, that stores a plurality of data transformation configurations and a plurality of rules; an integration service, also coupled to the enterprise messaging system and comprising a data transformation engine using the data transformation configurations stored in the database storage system and a rules evaluation engine using the rules stored in the database storage system; and a plurality of agent-adapters, further coupled to the enterprise messaging system with each agent-adapter coupled to a respective one of the computer applications to pass messages between the enterprise messaging system and the respective computer application.

In accordance with a third important aspect of the present invention, the article of manufacture comprises a computer-readable medium embodying code segments for integrating a plurality of computer applications. Such code segments generally include: (a) a first code segment for passing messages between the computer applications; (b) a second code segment for performing data transformation of messages; (c) a third code segment for applying rules to messages; and (d) a plurality of fourth code segments, each of which passes messages between respective computer applications and the first code segment.

The apparatus of the invention also includes a computer programmed with software to operate the computer in accordance with the invention. Non-limiting examples of a "computer" in this regard include: a general purpose computer; an interactive television; a hybrid combination of a general purpose computer and an interactive television; and any apparatus comprising a processor, memory, the capability to receive input, and the capability to generate output.

The article of manufacture of the invention comprises a computer-readable medium embodying code segments to control a computer to perform the invention. Non-limiting examples of a "computer-readable medium" in this regard include: a magnetic hard disk; a floppy disk; an optical disk, such as a CD-ROM, a CD-R, a CD-RW, or one using DVD standards; a magnetic tape; a memory chip; a carrier wave used to carry computer-readable electronic data, such as those used in transmitting and receiving electronic mail or in accessing a network, such as the Internet or a local area network ("LAN"); and any storage device used for storing data accessible by a computer. Non-limiting examples of "code segments" include computer programs, instructions, objects, software, or any means for controlling a computer.

Other novel and equally important aspects of the present invention will become more apparent from a detailed description thereof, when considered in conjunction with the following drawings wherein:

DETAILED DESCRIPTION OF THE INVENTION

Figure 1A:
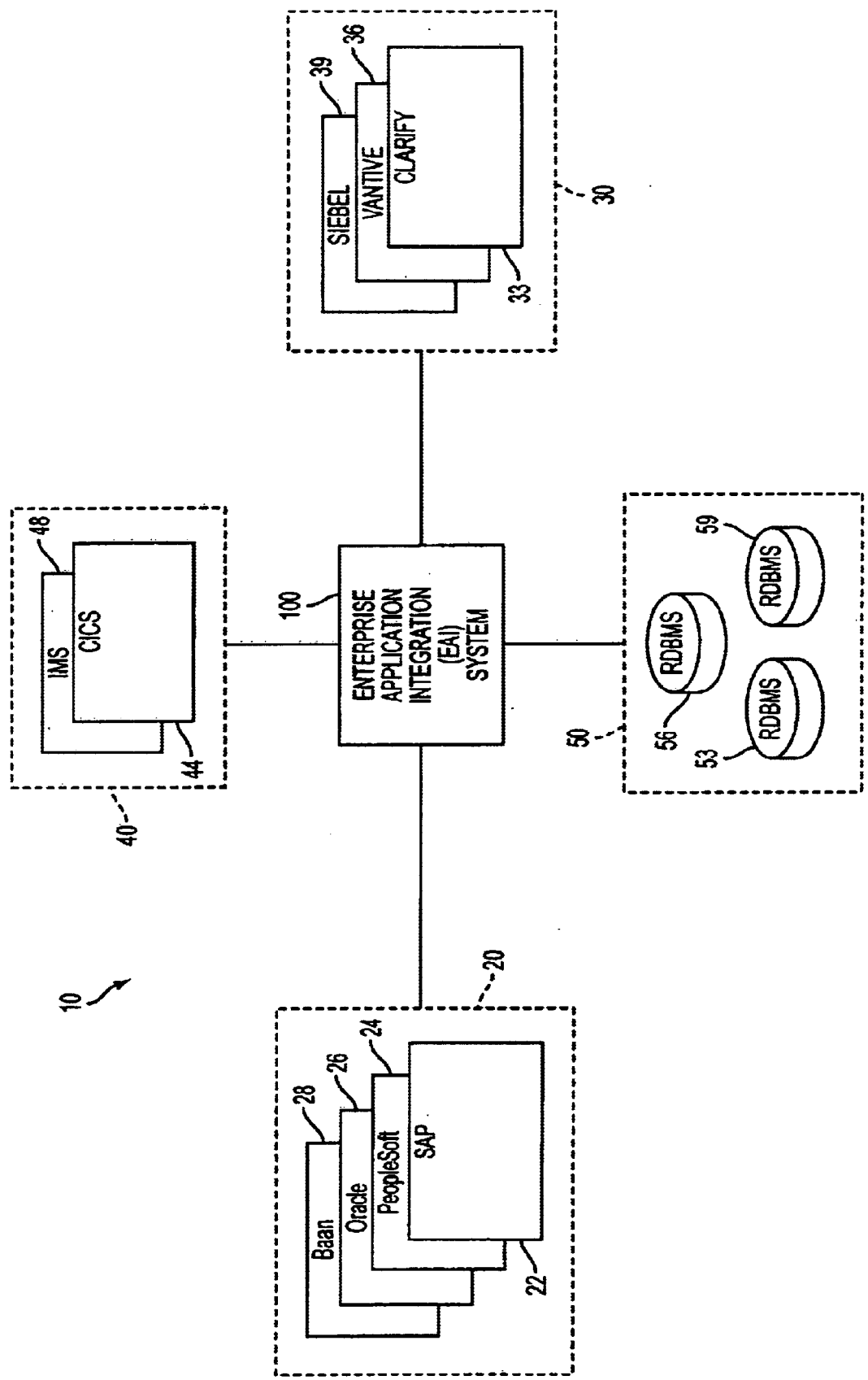
FIG. 1(a) depicts an enterprise application integration (EAI) system according to the present invention, as it is incorporated within an environment including legacy systems, packaged software applications, and relational database management systems.

Referring now to the drawings, wherein like reference characters or numerals designate like or corresponding parts throughout each of the several views, there is shown in FIG. 1(a) a simplistic view of an enterprise computing runtime environment 10. Typical runtime environments 10 use a plurality of packaged software applications, including "back-office" applications 20 for enterprise resource planning (ERP) and "front-office" applications 30 for customer relationship management (CRM), one or more customized legacy systems 40, and one or more multi-dimensional/relational database management systems (RDBMS) 50.

Throughout the past few decades, business enterprises have designed or bought many large, single-purpose software applications. These "legacy" applications continue to be used, and most often were designed to perform a specific function (e.g., inventory, finance, accounting, sales force automation, and human resources). More recently, substantial investments have also been made by those same enterprises to procure packaged software applications from software developers such as SAP, PeopleSoft, Oracle, and Baan.

Each of these packaged software applications enjoyed its own unique strengths. Accordingly, the typical business enterprise used two or more disparate packaged software applications in the same runtime environment. Such packaged software applications were not, in the beginning, designed to share information among themselves. As a result, enterprises had been forced to integrate their disparate packaged software applications with expensive custom code. Such integration efforts often took months, if not years, to complete.

Enterprise application integration (EAI) systems, such as the system 100 shown in FIG. 1(a), therefore, became a necessity. However, unlike EAI systems according to the prior art, system 100 comprises a solutions-oriented middleware, which facilitates its users to modify and fully integrate information residing within disparate applications through a single, common infrastructure. It allows the user to move information seamlessly, transparently, and quickly among employees, customers, and suppliers, to achieve maximum productivity.

In such a manner, the system 100 provides a reliable store-and-forward messaging system, a capable message brokering facility, and a strong agent-adapter architecture for integrating disparate enterprise applications. It is distributable, designed for easy administration and management, and is targeted to the complete, heterogeneous computing requirements of a large organization. It intelligently links various applications so they can access and share information. It is middleware that adapts to applications, rather than forcing applications to adapt to it.

System 100 solves most EAI problems by enabling its users to link ERP applications 20, packaged applications 30, custom and legacy applications 40, and databases 50 throughout the enterprise, with minimal custom coding. When fully integrated, an enterprise can quickly synchronize global businesses and divisions and respond to ever changing market demands. With faster access to customer and billing information, the user's organization can service customers more effectively and efficiently, creating stronger, more effective relationships.

The system 100 is a business-centric enterprise integration solution, with an integration flow design environment that targets the business analyst. The analyst defines the problem in business terms, and the product handles the technical issues.

Figure 1B:
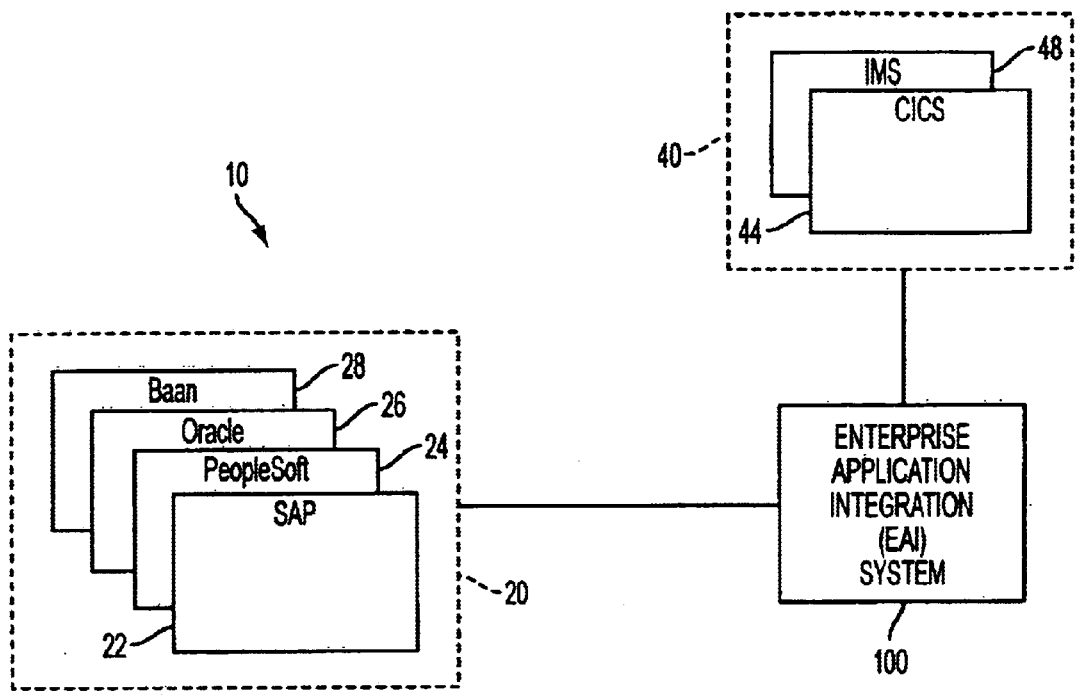
FIG. 1(b) illustrates a first scenario in which the system that is shown in FIG. 1(a) is used to integrate an enterprise resource planning (ERP) packaged software application with custom legacy systems.

For example, as shown in FIG. 1(b), the common scenario of enterprise resource planning (ERP) integration with custom legacy systems demands that the organization encapsulate complex processes properly within standard ERP implementations—not an easy thing to do. Many corporations choose to implement packaged applications for standard business processes such as inventory and order management. But packaged applications are seldom used for vertical processes. For these purposes, the system 100 is ideal. It provides object interfaces for the ERP systems 22, 24, 26, 28, as well as wrapper-generation technology for linking to legacy systems 44, 48.

Figure 1C:
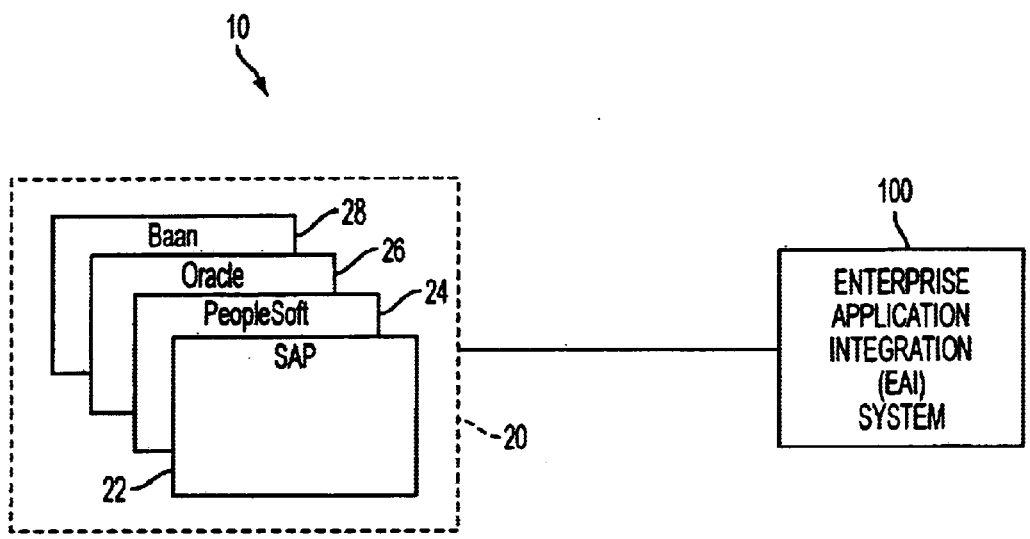
FIG. 1(c) illustrates a second scenario in which the system that is shown in FIG. 1(a) is used to integrate two or more disparate ERP packaged software applications.

The extension of the global supply chain also requires that middleware bridge two or more disparate ERP systems 22, 24, 26, 28 . As illustrated in FIG. 1(c), it can be readily appreciated that nothing may be more important to a business-to-business collaboration. The system 100, thus, plays a key role by enabling inter-ERP transactions in which business events in one system (e.g., SAP system 22) invoke corresponding events in another system (e.g., Baan system 28) without exposing the details of the underlying technology.

Figure 1D:
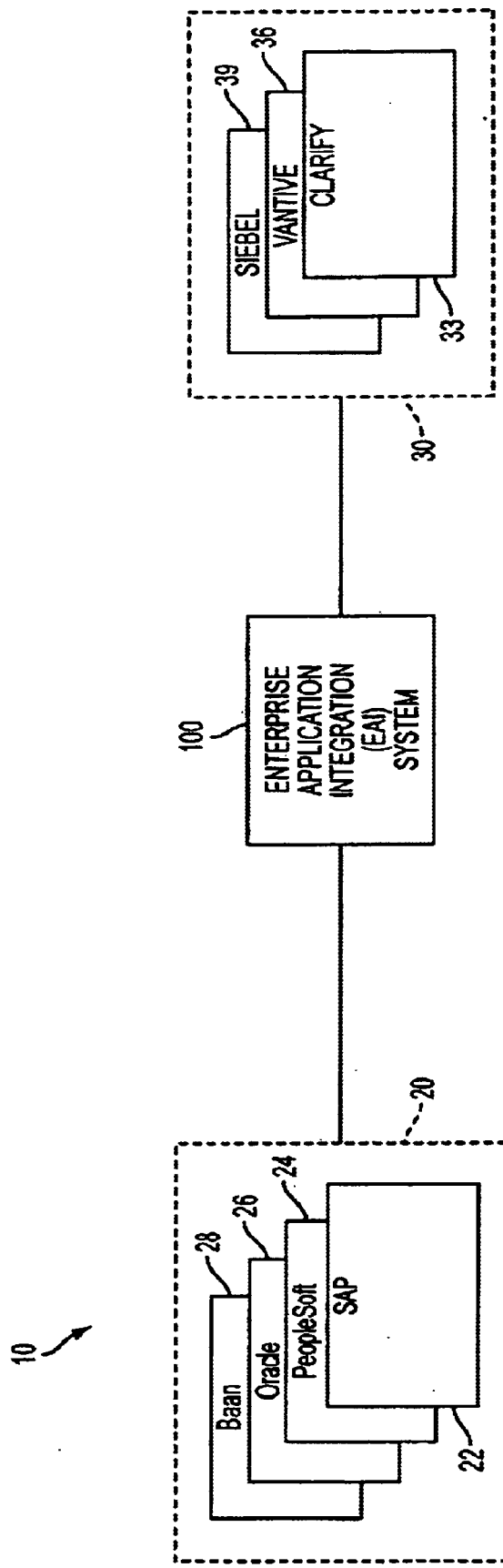
FIG. 1(d) illustrates a third scenario in which the system that is shown in FIG. 1(a) is used to integrate one or more front-office packaged software applications with one or more back-office packaged software applications.

Integration of a corporation's "front-office" with its "back-office" is an important function, which allows front-office applications that interact with the customer to collaborate with back-end production applications. For example, and referring now to FIG. 1(d), it is critically important that customer-support systems collaborate with ERP inventory modules. System 100, thus, facilitates integration of best-of-breed front-office and back-office applications seamlessly and transparently.

Figure 1E:
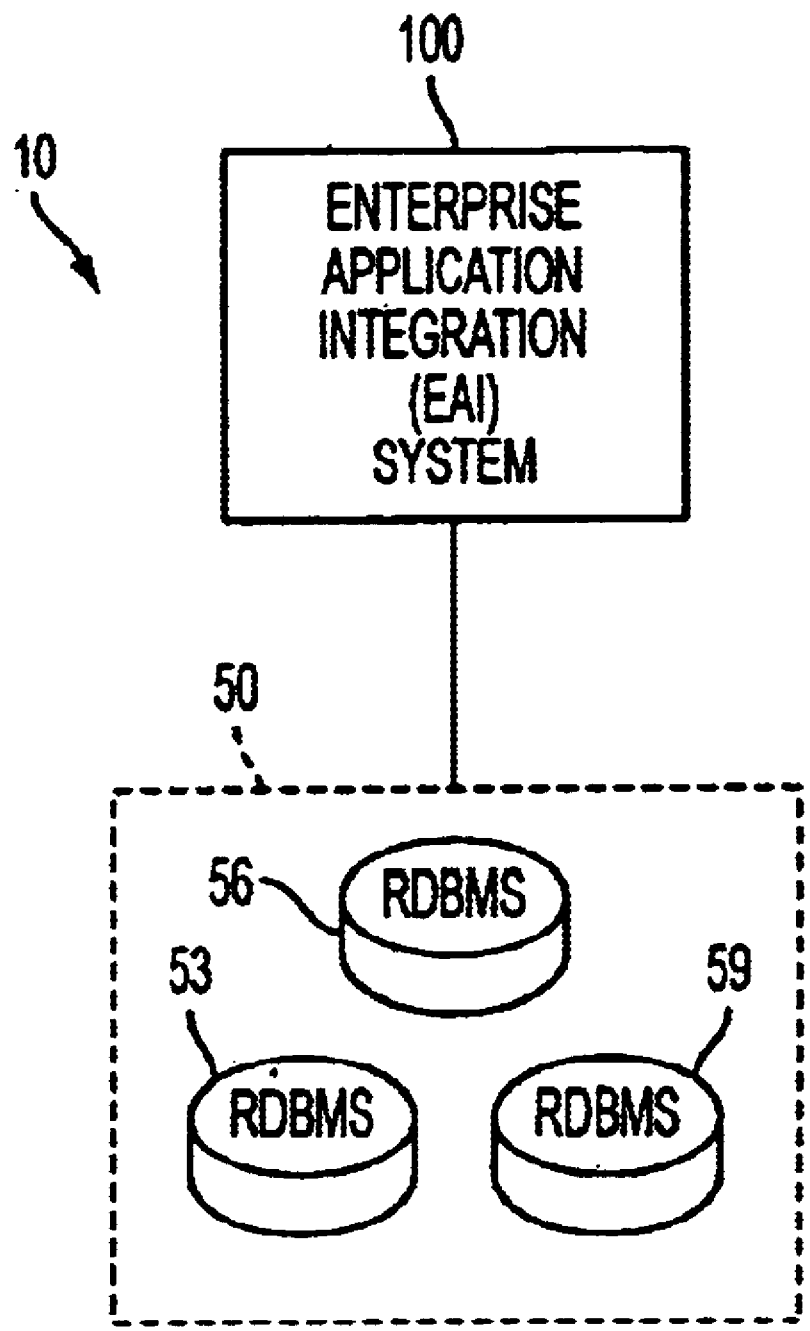
FIG. 1(e) illustrates a fourth scenario in which the system that is shown in FIG. 1(a) is used to integrate data warehouse software applications using two or more disparate relational database management systems (RDBMS) or multi-dimensional database management systems.

In the data warehouse scenario as shown in FIG. 1(e), data from disparate systems must migrate to a central data warehouse or repository. Moving real-time information from several ERP systems (not shown in FIG. 1(e)) to a central relational or multi-dimensional database containing a plurality of different databases 53, 56, 59 is exemplary of this problem. However, data warehouse developers can leverage the data translation services of system 100, as is described in greater detail herein below, for real-time data aggregation or other operations. Data is, thereby translated into an understandable and meaningful condition.

Figure 2:
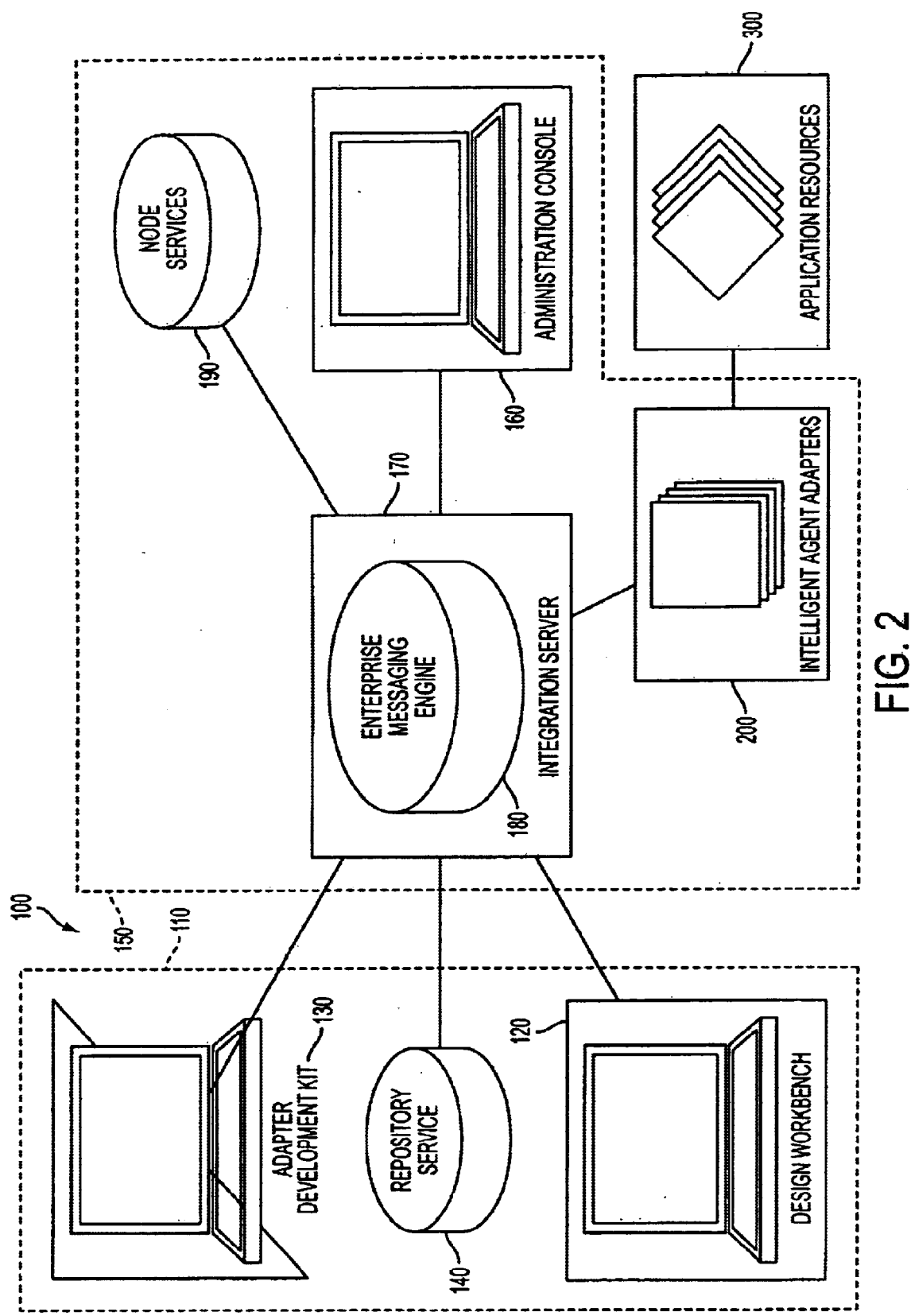
FIG. 2 is a block diagram of the EAI system that is shown in FIGS. 1(a) through 1(e)

As illustrated in FIG. 2, system 100 generally comprises a plurality of design components 110 and a plurality of runtime management components 150. The design components 110, in turn, more specifically comprise an integration workbench 120, an adapter development kit (ADK) 130, and a repository service 140. The runtime management components 150, in turn, more specifically comprise an administration console 160, an integration server 170, including an enterprise messaging engine 180, a node services component 190, a plurality of intelligent agent-adapters 200.

The integration workbench 120 generally comprises a graphical modeling and configuration tool for integration project development. It is used to define events, those messages associated with such events, integration flows, and business rules associated with such integration flows, as well as to identify those agents that publish and subscribe to the defined events. In addition, the integration workbench 120 provides diagnostics for consistency checking and testing integration flows.

Figure 3:
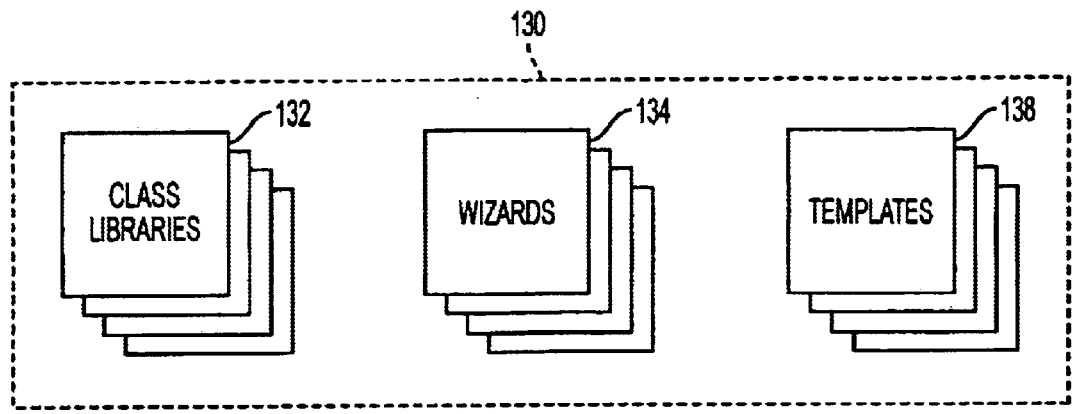
FIG. 3 depicts an adapter development kit used in the system that is shown in FIG. 2.

The ADK 130 is used to configure and generate customized intelligent agent-adapters 200. Shown in greater detail in FIG. 3, ADK 130 generally comprises an object framework including class libraries 132, wizards 134, and templates 136. The ADK 130 generates objects that can be accessed from conventional development tools. While system 100 includes a plurality of standard intelligent agent-adapters 200 for a wide range of applications and resources, there may be specific applications for which there is no such standard intelligent agent-adapter 200. In that event, ADK 130 further permits a custom, intelligent agent-adapter 200 to be built by those developers who are more familiar with the published interfaces that are provided by the target application environment.

The repository service 140 generally comprises a relational database (which contains all of the specifications for system 100, meta-data, and message broker service rules), and an interface to that relational database.

The administration console 160 is used to configure and manage the runtime environment of system 100, and generally comprises a graphical console. It serves as a control point for system configuration, maintenance, monitoring, and diagnostics. Through the administration console 160, each of the individual components of system 100 are managed, including comprehensive services such component initiation and termination, and built-in software distribution.

The integration server 170 implements intelligent messaging by triggering and executing integration flows to process events. It executes static and dynamic context sensitive rules that evaluate, modify, and route event data. As noted herein above, integration server 170 includes the enterprise messaging engine 180 comprising a distributed messaging subsystem, which manages all event data. It is, on the one hand, a key component of system 100. On the other hand, it is largely transparent to any user of system 100, and generally operates behind the scenes. It supports full persistence, once-and-only-once message delivery, and an in-memory mode for non-critical, high volume message requirements.

The node services component 190 manages start/restart recovery, exception handling, and dynamic configuration of system 100. It provides facilities for automated system installation and remote management across all participating clients and servers. Moreover, it is readily capable of installing and updating components remotely.

As noted herein above, the plurality of intelligent agent-adapters 200 include not only those standard intelligent agent-adapters 200 that are distributed with system 100, but also those custom intelligent agent-adapters 200 that are developed by ADK 130. Each such intelligent agent-adapter 200, regardless of its type, generally comprises a runtime interface module connecting a particular one of the external application resources 300 to system 100.

Figure 4A:
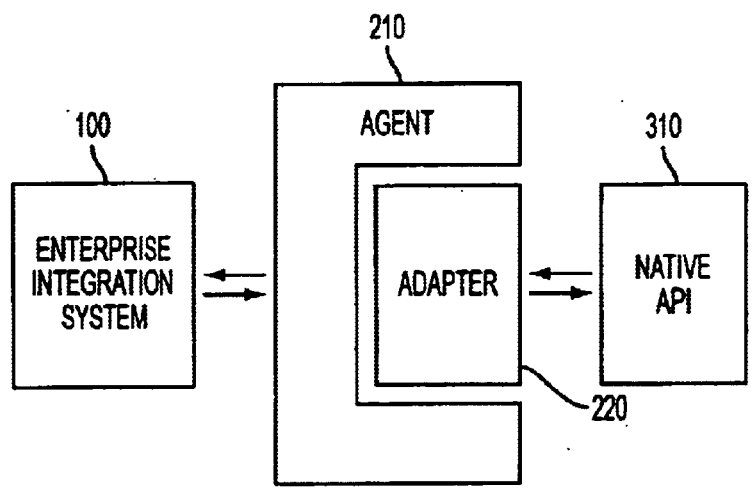
FIG. 4(a) illustrates a basic agent-adapter architecture that is useful in accordance with a first embodiment of the present invention.
Figure 4B:
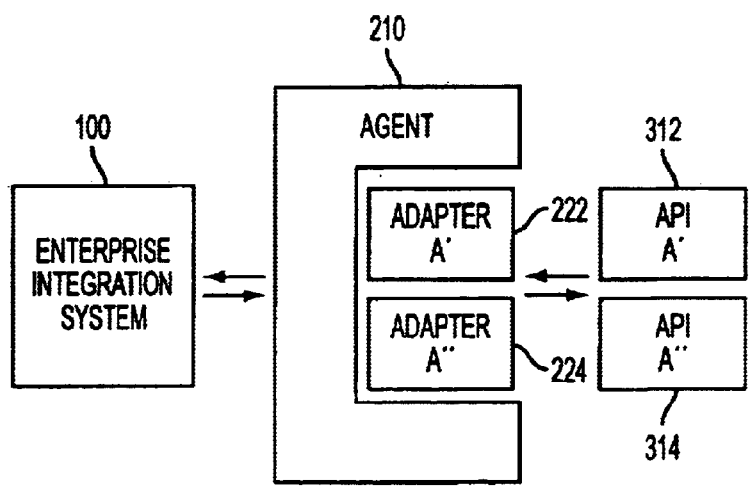
FIG. 4(b) illustrates an extensible agent-adapter architecture that is useful in accordance with a second embodiment of the present invention.

Referring for the moment to FIGS. 4(a) and 4(b), it may be appreciated that such intelligent agent-adapters 200, in accordance with a particularly important aspect of the present invention, combine the functionality of autonomous agents with adapter technology. The agent component 210 acts as an independent software process, which hosts one or more adapter components 220 (FIG. 4(a)), or 222 and 224 (FIG. 4(b)). It encapsulates sophisticated functionality such as store and forward caching, filtering, resource pooling, and scheduling.

A primary advantage of this agent-adapter architecture is its ability to host complex business logic in order to maintain state and negotiate transactions with the application resources 300. This ability may be thought of as "conversational mode processing", which is particularly critical when integrating application resources 300 of a transactional nature. More often than not, data elements that may be required for brokering messages from such application resources 300 are deeply nested within sub-transactions. These deeply nested data elements can, thus, be obtained only by engaging in a conversation with the transactional application resource 300. Otherwise "primitive" adapters, which have been used in the past, do not adequately address the complex behavior of transactional application resources 300.

As shown in FIG. 4(a), a typical intelligent agent-adapter 200 according to the present invention includes an agent component 210 and an adapter component 220. On one side of this architecture, the agent 210 conforms to a specified event and messaging model of the system 100. Adapter 220, on the other side of this agent-adapter architecture, uses a native application programming interface (API) 310 of a particular application resource 300, or other suitably published interface mechanism. Together, agent 210 and adapter 220 mediate differences in interface protocols and data structures to provide a uniform, normalized view of the business events that they publish and consume.

Unlike past approaches to EAI, the foregoing agent-adapter architecture is extensible. It not only facilitates an ability to seamlessly accommodate changes to existing APIs, but it also continues to enable the use of those existing APIs with legacy systems. Shown more clearly in FIG. 4(b), this extensible agent-adapter architecture generally comprises an agent 210 encapsulating a first adapter A' 222 and a second adapter A" 224.

Adapter A' 222, for example, corresponds to an application resource 300 having a basic set of APIs A'. On the other hand, adapter A" 224 corresponds to the same application resource 300 having a newer set of APIs A". Users of such an extensible agent-adapter architecture may thereby choose to simultaneously adapt to both interfaces A' and A". For example, the basic set of APIs A' may correspond to a production environment, while the newer set of APIs A" may correspond to a pre-production environment of a newer version of a particular application resource 300. The newer set of APIs A" could, thus, be tested "live" within system 100, at the same time that the basic set of APIs A' will be used to maintain previously tested and proven functionality. In such a manner, this extensible agent-adapter architecture enables perfectly seamless negotiation of incremental changes to the application resource 300 into the integration environment.

Figure 5:
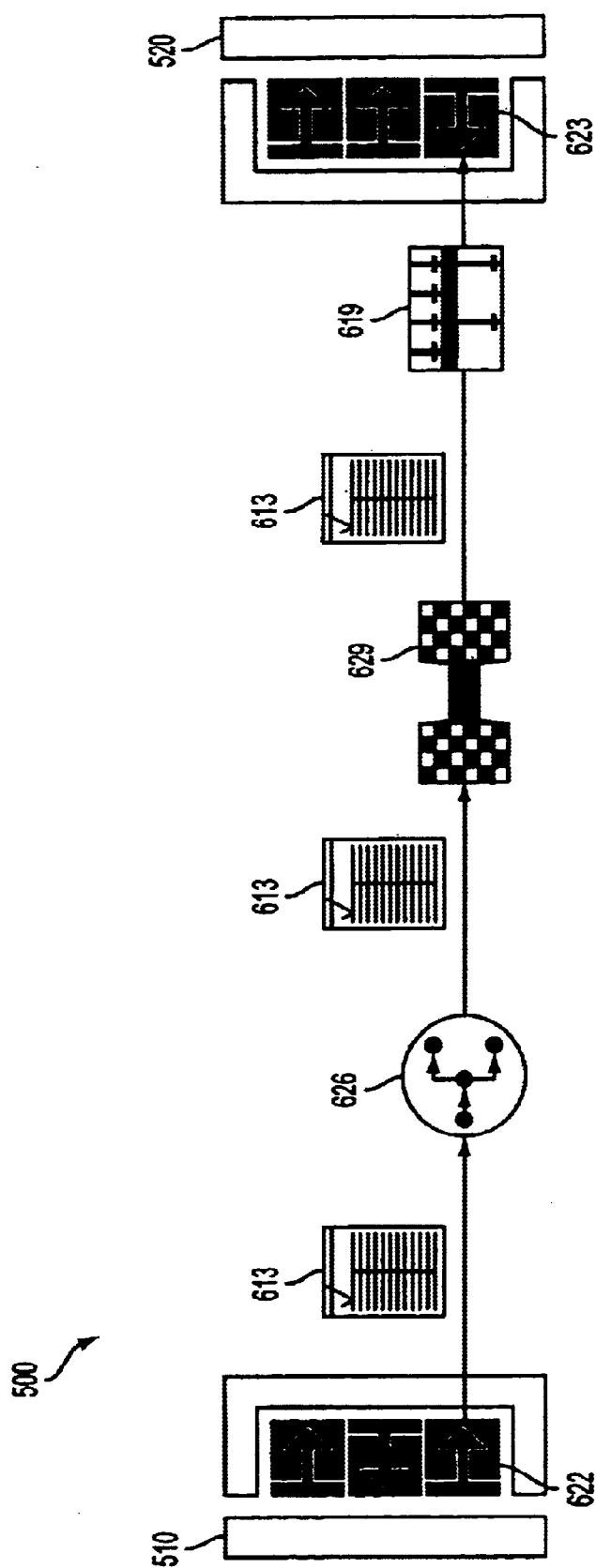
FIG. 5 is a block diagram of a typical integration flow according to the present invention.

The manner in which system 100 shares data among enterprise applications is determined by integration flows. As shown in FIG. 5, a typical integration flow 500 uses one or more system messages. Each such message generally comprises a communication in a platform-neutral format to move selected data from software application to software application.

Figure 6A:
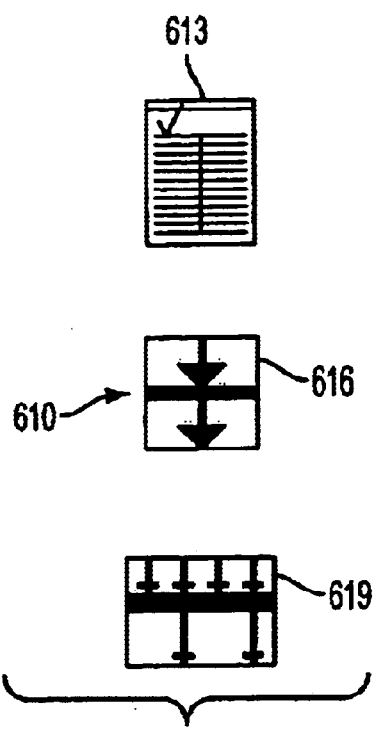
FIGS. 6(a) and 6(b) illustrate design and integration objects used in the system according to the present invention.
Figure 6B:
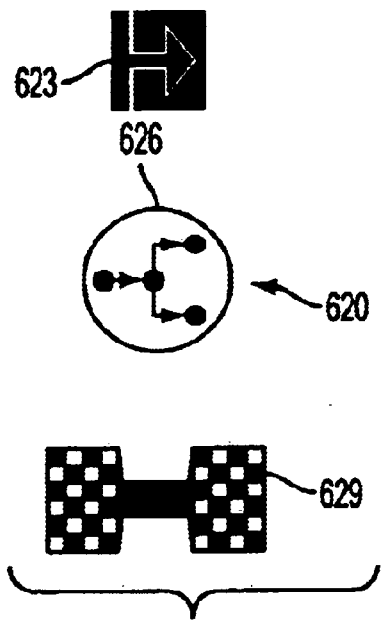

Referring for the moment to FIGS. 6(a) and 6(b), it should be noted that integration flow 500 is made up of a plurality of objects 600 as well as links among those objects. Each of those objects 600 performs a specific task, which relates to the system messages that carry data from software application to software application.

For example, any given object 600 comprises either a definition object 610 or an integration object 620. There are three basic types of definition objects 610, which may be used according to the present invention: (1) a message definition 613; (2) a mapping definition 616; and (3) a filter definition 619. Definition objects 610 may be used repeatedly in any given integration flow 500. For example, the same message definition 613 must be assigned to all objects 600 that will handle system messages produced using that message definition 613. Moreover, the same filter definition 619 may be used in multiple sections of an integration flow 500.

The message definition object 613 identifies data that the system 100 is to extract from or propagate to an enterprise application 510, 520. It also defines how the system 100 not only will construct system messages from enterprise application data, but also create enterprise application data from system messages.

Mapping definition objects 616 define how the system 100 will transform system messages extracted from one or more enterprise applications 510, 520 into system messages needed by other enterprise applications 510, 520.

A filter definition object 619 defines criteria that the system 100 will use to filter unwanted system messages out of integration flows 500. In an integration flow that transforms new customer data into invoices, for example, one filter definition object 619 that might be useful would be one in which system messages about customers who have already paid would be filtered out.

Integration objects 620, of which there are three basic types, actually send or receive system messages. The three basic types of integration objects are: (1) an adapter 621; (2) a message hub 626; and (3) a transformer 629. Furthermore, there are three basic types of adapters: (a) a source adapter 622; (b) a target adapter 623; and (c) a reply adapter 624.

A source adapter 622 extracts the data from a source enterprise application 510, constructs system messages from that data, and sends those system messages to other integration objects 620 (e.g., message hub 626). A target adapter 623 receives system messages from other integration objects 620 (e.g., transformer 629 through filter definition object 619), creates application data from those system messages, and propagates that data to a target enterprise application 520. A reply adapter 624 (not shown in FIG. 5) replies to requests for data from some other integration objects 620 by extracting the data from applications 510,520, and then sending it to the requesting object 620.

In general, message hubs 626 are used to receive system messages from one or more source integration objects 620, and to hold those system messages until the system 100 can deliver the same to one or more target integration objects 620.

Transformers 629 are generally used to implement mapping definitions in three steps. They first gather system messages from source integration objects 620 (e.g., message hub 626). After the gathering step, they next transform the content and format of the data contained within such system messages. They finally produce and send output system messages to target integration objects 620 (e.g., target adapter 623).

Message definitions 613 are the primary objects around which the integration flow 500 according to the present invention is built. When a user creates an integration flow 500, a message definition is assigned to every object 600 in that flow. A message definition 613 not only identifies the kind of system message that the object 600 is to handle, but it also defines the hierarchical structure or schema of that system message.

For example, a message definition 613 must be assigned to every source adapter 622 in the user's integration flow 500. Each source adapter 622 knows what kind of message it is to produce, based on the message definition 613 the user has assigned to it. Adapters 621, hubs 626, and filters 619 handle just one message definition 613. Mapping definitions 616 and transformers 629, on the other hand, are capable of handling multiple message definitions 613, both as inputs and outputs.

Some applications 510, 520 can create the Java data types that system 100 supports. In those cases, the source adapter 622 can extract the data types specified in its message definition 613 and store them directly in a system message. Likewise, a target adapted 623 can retrieve the data types from a system message and insert them directly into the application (e.g., target enterprise application 520). Other applications 510, 520 use a well-defined message format to describe the layout of their native data. In those cases, the message definition 613 for a source adapter 622 must include instructions for creating Java types from the application data. Similarly, the message definition 613 for a target adapter 623 must include instructions for creating application data from the system Java objects.

A special kind of message definition 613 (i.e., the request/reply message definition) is used by integration objects 620 such as transformers 629 to request data from other the system objects 610, 620. Message definitions 613 can also specify message validation criteria. System 100 uses this criteria to determine whether system messages produced by adapters 621 and transformers 629 contain valid data (e.g., where the user includes a message definition 613 defining messages, which contains employee payroll information). The user, accordingly, may prevent inaccurate salary data from entering the system 100. If the message definition 613 contains an item element "Salary", for example, the user could then define validation criteria for the item stating that the message is valid only when the value in "Salary" is a positive number.

The user may organize related message definitions 613 into logical groups called message categories. Suppose, for example, that the user is integrating three applications using the system 100. The user might group the messages in the user's project into three message categories, one for each application.

Figure 7:
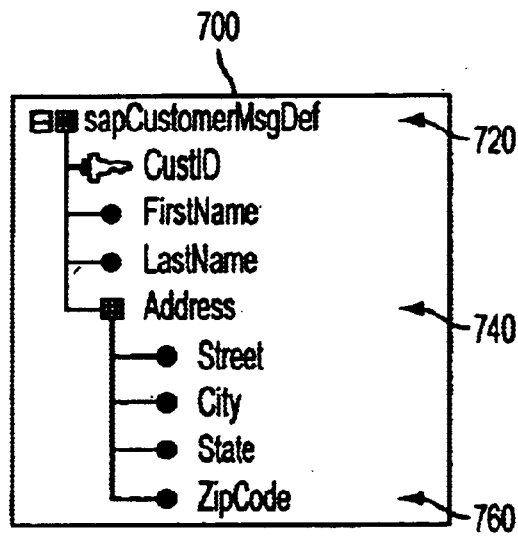
FIG. 7 illustrates a message schema used in the system according to the present invention.

The following describes in greater detail those elements that make up system messages and provides further details in regards to message validation. A message definition's message schema is made up of data objects, called message elements, which are arranged in a hierarchical structure as shown in FIG. 7. In general, a message schema 700 comprises one or more sections 720, one or more tables 740, and one or more items 760. Either a section 720 or a table 740 must appear at the top of message schema 700 hierarchy.

A section 720 is a non-repeating group of message elements. Such section elements do not themselves contain actual data. Instead, they contain other message elements that contain data (i.e., they contain items 760). Sections 720 can contain any combination of message element types.

A table 740 is a group of section elements, called rows that can repeat any number of times. Table elements also do not contain actual data. They contain other message elements that contain data (i.e., they contain items). Tables 740 can contain any combination of message element types.

An item 760 is a message element that contains data. Items 760 are the lowest level message elements in the hierarchy of the message definition. They cannot contain other message elements.

Each message definition can contain criteria for validating messages based on that definition. That is, when the user define a message definition, the user can specify criteria that data in individual message elements must meet for a message to be considered valid within the system 100.

The user can specify validation criteria for all levels of a message. That is, the user can specify criteria for message items within sections or within tables. The entire message either passes the validation criteria and continues through the flow, or does not pass and is discarded. If even one row of a table does not pass specified criteria, the entire message does not pass. The system 100 validates every message produced by an adapter 621 or transformer 629 using the validation criteria in the appropriate message definition.

Adapters 621 connect with enterprise applications 510, 520 to extract or propagate data. Each adapter 621 produces, receives, or replies to messages using the message definition the user assigns to it. The system 100 provides standard adapters 621 for the applications 510,520 it will integrate. Each standard adapter 621 is either a source 622, target 623, or reply adapter 624, and is designed for a specific agent service type. For example, for EntireX Broker, the system offers an ETB Standard Source Adapter and ETB Standard Target Adapter. Standard adapters are generic. They provide basic exception handling and can handle any message definition. If a standard adapter does not include all code the user needs to interact with an application (e.g., the user wants to specify more detailed exception handling), the user can create a custom adapter using the ADK 130. The user can also use the ADK 130 to create custom adapters 621 for applications 510, 520 not currently supported by the system 100. Likewise, the user can use the ADK 130 to create custom adapters 621 that connect to any application with a JAVA application programming interface (API).

To use a standard or custom adapter 621 in an integration flow 500, the user must configure it to handle a specific message definition. The user can configure as many of each type of adapter 621 as necessary to handle all messages the user need to include in integration flows 500.

Source adapters 622 extract data from enterprise applications and produce messages that they send to other integration objects. Specifically, a source adapter 622: (1) polls for or is notified by its application of a particular type of event that has occurred at the application (e.g., data on a new customer has been entered); (2) extracts the data relating to the event from the application; (3) using message definition instructions, constructs a system message from the data; and (4) produces a message and sends it to one or more target integration objects 620.

Target adapters 623 receive messages from other the system objects 610, 620 in integration flows 500 and propagate the message data to enterprise applications 510, 520. Specifically, a target adapter 623: (1) receives system messages from one or more source integration objects 620; (2) using message definition instructions, creates application data from the system message; and (3) propagates the data to the target application 520 by inserting new data, updating data, or deleting data as appropriate.

Reply adapters 624 extract data from enterprise applications 520 when requested by integration objects 620 such as transformers 629. Specifically, a reply adapter 624: (1) receives a request message from an integration object 620; (2) extracts the requested data from its enterprise application 520; and (3) sends the data to the transformer 629 in a reply message based on the same message definition as the request message.

Adapters 621 are hosted by agent services. Agent services provide information adapters 621 need to connect to their applications 510, 520 (e.g., passwords and user IDs). The system 100 offers agent services for every enterprise application 510, 520 it can integrate. That is, it offers an SAP R/3 agent service, an EntireX Broker agent service, and so on. The system 100 also offers agent services for custom adapters the user create using the ADK 130.

The user needs one agent service for each enterprise application 510, 520 the user wants to integrate using the system 100. For example, if the user wants to integrate three SAP R/3 systems with one RDBMS, the user needs three SAP R/3 agent services and one RDBMS agent service. Each agent service hosts all adapters 621 for the enterprise application 510, 520 to which the agent connects.

Mapping definitions 616 define a process that transforms messages containing data extracted from one or more applications 510, 520 into messages containing data needed by one or more applications 510, 520. Transformers 629 implement mapping definitions 616 by gathering input messages from source objects, transforming the data, and sending output messages to target objects.

The transformation process defined in a mapping definition 616 always involves at least two kinds of messages: the primary input message, and one or more output messages. The primary input message typically contains most or all of the data the user want to send in output messages to the target applications. Output messages contain data from the input messages, transformed as necessary for target applications 520.

When the user create a mapping definition 616, the user identifies the message definition 613 that defines the messages the user want to use as the primary input, and the message definitions 613 that define the messages the user want to produce as outputs. A single transformation process can produce any number of outputs. The user then creates a sequence of steps that define when to read input data, how to transform the input data, how to map the input data from input message definitions to output message definitions, and when to write the transformed data to actual output messages.

The user can transform input data in any way necessary to create the output messages the user need. For example, the user can create a transformation expression that specifies concatenating a message item containing a customer's first name and a message item containing the customer's last name, because a target application requires the customer's full name in one data field. On the other hand, the user can create a transformation expression that specifies selecting only certain characters from a message item, or padding a message item with spaces to make it the right length for the corresponding data field in the target application. The user can produce different output messages by writing them at different points in the transformation process.

When the primary input message does not contain all data needed to produce the output messages, the user can obtain supporting input for the transformation process using request/reply message definitions. For example, suppose the primary input message the user is using in the mapping definition uses abbreviations for United States state names (e.g., Va. for Virginia).

The target application 520 requires full state names. To obtain the full state names needed to produce the output messages, the user would use a request/reply message definition that can send the abbreviations to an application and receive the state names in return.

After the user has created a mapping definition 616, the user can test it to make sure it produces the proper output messages before using it in an integration flow 500. The user can then assign the mapping definition to one or more transformers 629.

A transformer 629 implements a mapping definition 616. When the user creates a transformer 629, the user specify objects 610, 620 to use as sources of the primary input message and the objects 610, 620 that are to be targets for the output messages. The user also specifies the objects that are to reply to requests for supporting inputs.

When the transformer 629 receives a primary input message from a source object, it runs the sequence of steps defined in the mapping definition 616 that make up the transformation process. It reads the primary and supporting input messages, transforms the input data, writes the transformed data to output messages, and sends the output messages to the target objects.

Figure 8:
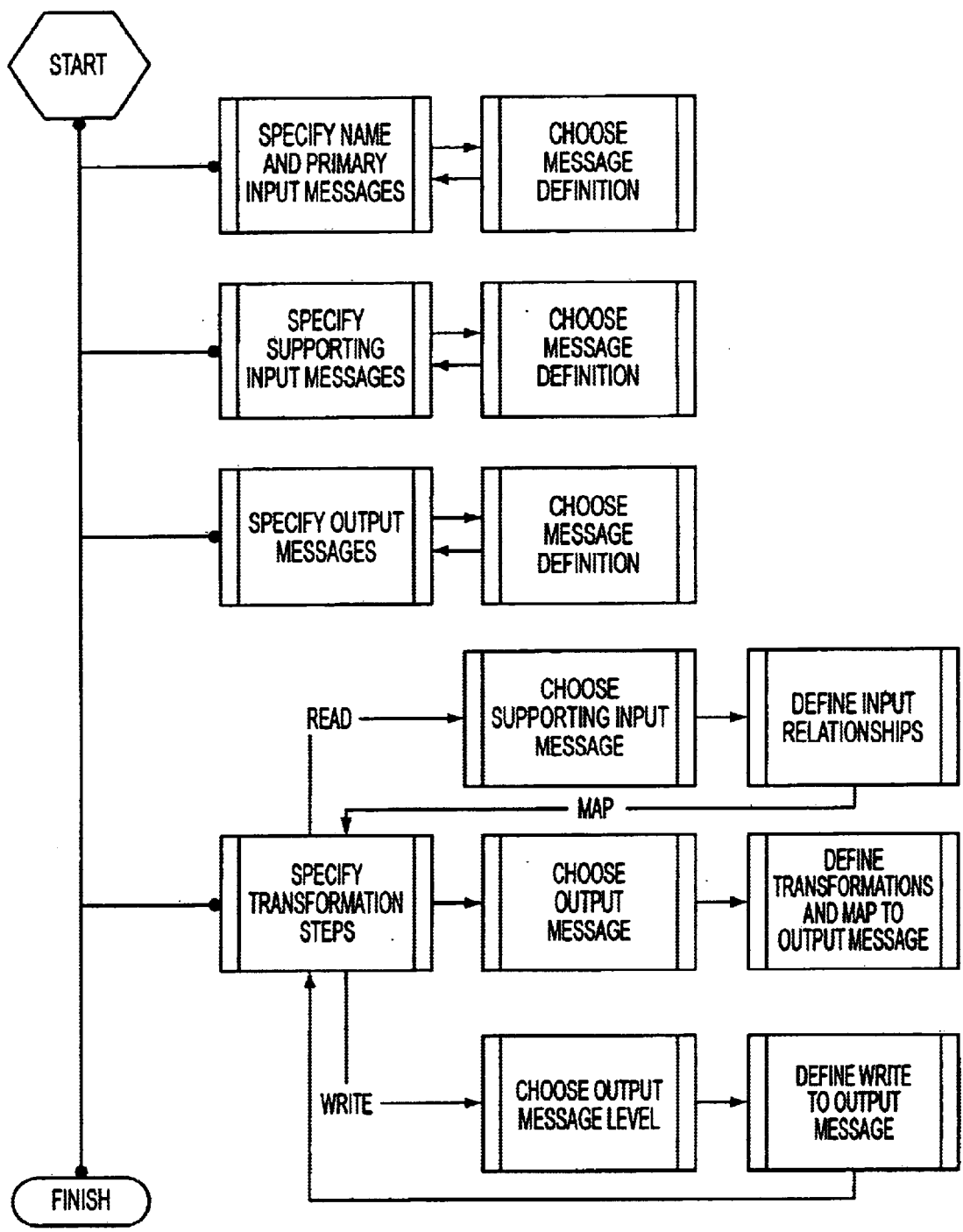
FIG. 8 illustrates a typical transformation process used in accordance with the present invention.

FIG. 8 shows a typical transformation process in which the transformer 629 receives a primary input message from a hub 626, obtains a supporting input message from a reply adapter 624, and sends two different output messages to two different target adapters 623.

Hubs 626 are message holding areas for adapters 621 and transformers 629. Hubs 626 allow adapters 621 and transformers 629 to exchange messages asynchronously, and simplify links among objects.

For example, the user may have a source adapter 622 that produces messages to a transformer 629. The user may want the adapter 622 to produce and send its messages regardless of whether the transformer 629 is ready to receive them. The user could set up the adapter 622 to send its messages to a message hub 626, and set up the transformer 629 to receive the adapter's messages from that hub 626. The system delivers messages from a hub 626 to a target object when the target is ready to receive them.

Furthermore, the user may have three source adapters 622 sending messages based on the same message definition 613 to five targets. If the user did not use a hub 626, the user would have to create a total of 15 links among the objects. On the other hand, if the user use a hub, the user would have to create and maintain only eight links. Message hubs 626 can hold one kind of message only (i.e., messages produced from a single message definition 613). Targets of hubs 626 have durable subscriptions. The system 100 keeps track of the messages each target object has received from the hub 626, as well as those that the target object has not yet received. If a target becomes inactive, the system 100 remembers the last message the target received. When the target next becomes active, the system 100 delivers only the messages the target has not yet received. If hub subscriptions were not otherwise durable, target objects would receive messages that arrived at hubs while the targets were active, but would never receives messages that arrived at the hubs when the targets were not active.

The user can choose from two messaging styles the user wants the system 100 to use when delivering messages from the hub 626: (1) point-to-point, where the system 100 delivers each message to the first available target only; or (2) publish/subscribe, where the system 100 delivers each message to every object the user has identified as a target of the hub 626.

If the user wants to screen a certain kind of data out of part of an integration flow 500, the user must use a filter definition 619. Filter definitions 619 specify criteria based on message data (i.e., data that passes the criteria continues through the flow), while data that does not pass the criteria is discarded.

When the user wants to filter a certain kind of message, the user creates a filter definition 619 and assigns it to one or more links between objects that handle that kind of message. The system 100 applies the criteria in the filter definition 619 to all messages sent along those links.

For example, consider the situation in which a hub 626 sends messages containing data on new customers to a target adapter 623. The user may want only data on customers who have not yet paid to reach the target adapter 623. In order to do so, the user creates a filter definition 619 that specifies the criterion "Status=Paid", and assigns it to the link between the hub 626 and the adapter 623.

The user can create one or more filter definitions 619 for each message definition 613 in the user's integration flow 500. The user can assign a single filter definition to multiple links, or the user can assign different filter definitions for the same kind of message to different links.

For example, consider the situation in which a hub 626 sends messages containing data on new customers to two adapters 623. The user may want one adapter 623 to receive only data on customers who have paid, and the other adapter 623 to receive only data on customers who have not yet paid. The user creates two filter definitions 619. One specifies the criterion "Status=Unpaid", and the other specifies the criterion "Status=Paid". The user then assign each filter definition to the appropriate link.

When the user creates a filter definition 619 for messages that do not contain tables of data, the criteria the user specify affects the entire message. The entire message either passes the filter criteria and continues through the flow, or does not pass and is discarded.

When the user creates a filter definition 619 for messages that contain tables of data, the user can specify criteria that affect the entire message or that affect only the data within a table. If the user specifies criteria for message items in a section 720, the entire message either passes the criteria and continues through the flow, or does not pass and is discarded. If the user specifies criteria for message items in a table 740, the message continues through the flow with only those rows of data that pass the criteria. Rows that do not pass the criteria are discarded.

For example, consider the situation in which a message contains a table 740 with nine rows of data, one for each of nine new customers. If the user set up a filter definition 619 that filters out customers who spent $1000 or less, rows containing data on customers who spent more than $1000 would continue through the flow, while rows containing data on customers who spent $1000 or less would be discarded.

After the user has created a filter definition 619, the user can test it to make sure it works properly before using it in an integration flow.

Once the system objects the user wants to use in an integration flow 500 exist, the user can indicate how the user wants the system 100 to route messages among them. To do so, the user sets up links among the integration objects 620. Each link establishes one object as a source and the other as a target, or one object as a requester and the other as a replier. Source adapters 622 are always message sources. They can send messages to target adapters 623 of the same agent service type (e.g., an SAP R/3 source adapter can send messages to an SAP R/3 target adapter), to message hubs 626, and to transformers 629.

Transformers 629 can be targets, requesters, and sources. They can receive primary input messages from source adapters 622, message hubs 626, and other transformers 629. They also can request supporting input messages from reply adapters 624 and message hubs 626, and send output messages to target adapters 623, hubs 626, and other transformers 629.

Message hubs 626 can be targets and sources. Target adapters 623 are always targets. They can receive messages from source adapters 622 of the same agent service type, from hubs 626, and from transformers 629.

By default, the system 100 uses "message persistence". That is, it writes each message it delivers from one integration object 620 to another to stable storage in a location the user specifies. If a system failure occurs while a message is in transit, the system 100 can retrieve the message from storage when the system is restored and deliver the message to its targets.

Because message persistence increases system overhead, the system 100 allows the user to turn off persistence for any integration object 620. However, if a system failure occurs while messages to or from that object are in transit, those messages might be lost. The system 100 offers other delivery-related options that help the user manage the user's system resources. The system 100 maintains message holding areas for each integration object in a flow 500. The user can also control the size of these holding areas.

The user can limit the number of messages the system 100 holds for each object at one time, and the user can limit the length of time the system 100 holds each message. If an integration object 620 produces messages more quickly than its targets can receive them, these limits can prevent the object's holding area from growing to a size that strains system resources.

The user designs all integration flows 500 within a project on the workbench 120. Those integration flows 500 that the user designs and saves (i.e., the definition 610 and integration objects 620 that the user creates, and the links among them) are all stored in the repository 140. The project is a logical structure that lets the user view the repository 140. Each installation of the system 100 has one project and one repository 140.

In accordance with another important aspect of the present invention, system 100 comprises a distributed system. That is, the user can run the system components that make up the system 100 on one or more physical machines (i.e., hosts), but all of the components working together as one application.

A node is a physical process that runs on a host and supports one or more services. Each node is a Java virtual machine (JVM) and is recognized by the operating system as a javaw.exe process. The user must create at least one node for each host that runs an enterprise application the user want to integrate. The user can have as many nodes as the user's business requirements dictate.

Figure 9A:
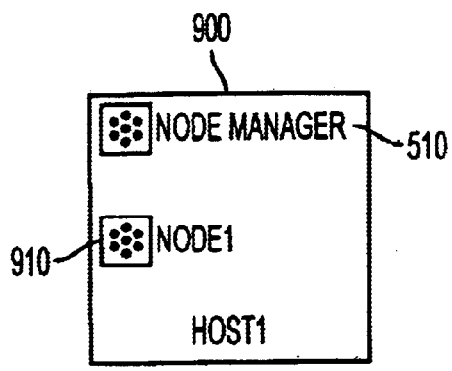
FIGS. 9(a) through 9(c) depict various operating environments in which nodes and services according to the present invention are managed.
Figure 9B:
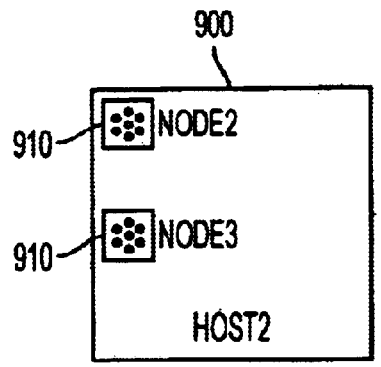
Figure 9C:
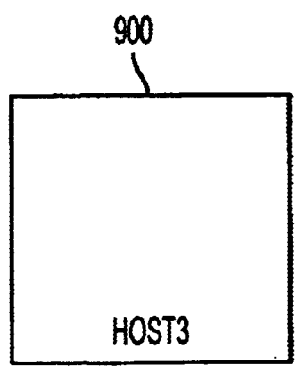

Each enterprise must also have a node manager. The node manager provides services to all of the other nodes in the system. It runs the user interface service (UIS) and the repository service 140. FIG. 9(a) illustrates an environment that has three hosts. Host1 runs the Node Manager, and Host1 and Host2 are both running nodes. In contrast, Host1 and Host2 as shown in FIG. 9(b) are both running services. Host3 cannot run services because is does not have a node.

The system 100 is a collection of system services and application services. System services support nodes and services. For example, the monitor service stores system runtime data for nodes and services. Application services provide the system's functionality. For example, CICS agent services support adapters that need to connect to CICS applications.

System services comprise the following. The user interface services (UIS) provide the facilities necessary to run the client components (i.e., the workbench 120 and the administration console 160). The repository services 140 stores configurations for all configured services and integration flow objects. Monitor services store system runtime data, including system logs and statistics information.

Application services comprise the following. Enterprise Messaging services (EMS) enable the system 100 to use multiple messaging modes, including point-to-point, publish/subscribe, and request/reply messaging. They support message hubs 626 and provide message persistence. Integration services (IS) enable the system 100 to transform messages, including splitting messages, combining messages, and manipulating message data. The IS supports transformers. RMI Factory manages remote method invocation (RMI) links to external applications. Routing services enable the system 100 to direct messages through the system 100 based on a message's content, including filtering message content according to criteria the user defines, and determining whether messages are valid. The routing service supports filters. Agent services support adapters 621. The user must install an agent service on each host that runs an enterprise application the user want to integrate.

System 100 also includes two client graphical user interfaces (GUIs) that enable the user to work with integration flows in the following manner. Regardless of whether the host runs the node manager, runs nodes and services, or does not run any nodes or services, the user may run clients on any host. The user may install as many clients as the user's business requirements dictate. For example, the user might want to install clients on a network-attached host to work with the user's integration flows 500 from a remote location. As described in greater detail herein below, GUIs on the workbench 120 enable the user to design integration flows 500. GUIs on the administration console 160, on the other hand, help configure and manage the system components (i.e., the nodes and services). Referring now to FIG. 13(*c*), both Machine2 and Machine3 can be seen as running the administration console 160 and workbench 120 clients. Machine1 is not running either of the administration console 160 or the workbench 120.

There are two primary interfaces within the system 100: (1) the workbench 120 and the administration console 160. The workbench 120 provides tools for creating and modifying integration flows 500, while the administration console 160 provides all of tools for managing the system nodes and services. Both are described in greater detail herein below.

Integration Workbench

Details regarding the installation and operation of integration workbench 120 may be found in the following documentation from SAGA Software, Inc., each of which is incorporated herein by reference: "System Administration Guide" (describes how to use the administration console 160 to configure and manage the system 100, and provides step-by-step procedures for working with user accounts, nodes, and services, managing the repository, and using log and statistics tools); "Workbench User's Guide" (describes how to use the integration workbench 120 to integrate application, provides step-by-step procedures for creating objects used in integration flows, and also provides reference material for operators and functions used in integration flows); "Adapter Development Kit Reference Manual" (serves as a reference guide for building custom adapters); "EntireX Broker Adapter Guide" (serves as a reference guide for configuring and modifying EntireX Broker adapters within the agent-adapter framework); "CICS Adapter Guide" (serves as a reference guide for configuring and modifying CICS adapters within the agent-adapter framework); "MQSeries Adapter Guide" (serves as a reference guide for configuring and modifying MQSeries adapters within the agent-adapter framework); "RDBMS Adapter Guide" (serves as a reference guide for configuring and modifying RDBMS adapters within the agent-adapter framework); "SAP R/3 Adapter Guide" (serves as a reference guide for configuring and modifying SAP R/3 adapters within the agent-adapter framework). Further details regarding functions may also be found in the Appendix attached hereto.

Creating an integration flow 500 in accordance with the present invention may be done as follows. The user first must obtain agent services from the system 100. On the administration console 160, the user then configures the system nodes of each host machine on which an application the user wants to integrate is running. Then, the user configures the required services on the nodes, including an agent service for each application that the user is going to integrate.

In order to plan an integration flow, the user should determine the following factors. For example, the user must determine the kinds of data the user need to extract from applications and propagate to applications. The user should also consider: (1) how the user wants to route messages among the system objects; (2) how the user needs to transform the data from one application so it can be used by other applications; and (3) whether the user needs to filter certain data out of the flow.

On the workbench 120, the user should first create a project, and then create an integration flow in the following manner. First, the user should configure adapters 621 to interact with the user's applications and create the message definitions 613 the user needs to produce the proper messages in the integration flow 500. These message definitions 613 should then be tested to make sure they produce the proper messages.

Next, the user should create hubs 626 to hold messages from adapters 621 and transformers 629. The user may then create mapping definitions 616 to transform messages from the source application 510 to messages for the target application 520. Furthermore, the user may create sample input messages and use them to test each mapping definition to make sure it produces the proper output messages.

Then, the user should create the transformers 629 necessary to implement those mapping definitions 616. As needed, the adapters 621, transformers 629, and hubs 626 should be linked. If the user needs to filter certain data out of the flow 500, the user should then create filter definitions 619. Preferably using sample messages, the user should next test the filter definitions 619 to make sure they filter out and proper data. Then, the user may assign the filter definitions 619 to links between objects.

On the workbench 120, the user should then check the validity of the integration flow 500 and correct it as necessary. The user may then save and close the project. On the administration console 160, the user should then configure the log viewer so the user can view messages on system activity. If the user wants to view statistics on system activity (e.g., number of messages produced in specific time intervals by individual transformers), the user should then configure the statistics viewer.

Again, on the administration console 160, the user may start the integration flow by starting the relevant system nodes and services, including the agent services for the applications the user is going to integrate. Next, the user will check the log and statistics to make sure the integration flow 500 is running properly. If the user needs to make changes to the integration flow 500, the user should accordingly stop the relevant services on the administration console 160, modify the integration flow 500 on the workbench 120, and restart services on the administration console 160.

The following describes to one of ordinary skill in the art the procedures that may be used with a source adapter wizard, a target adapter wizard, and a reply adapter wizard, all in accordance with the present invention, to properly configure an adapter. In general, there are four separate processes. First, one must carry out the following general steps: (1) naming the adapter; (2) choosing the agent service one desires to host the adapter; and (3) choosing the message definition for messages that the adapter is to produce, receive, or reply to. Second, one must carry out the following general steps: (1) choosing a particular adapter that is to be configured (i.e., standard or custom); (2) providing connection information; and (3) providing implementation information. More often than not, the step of providing implementation information includes the step of extracting the message definition of that adapter.

The third process depends on the type of adapter to be created. If one is creating a source adapter, one must specify the targets to which the adapter is to be used to send messages. On the other hand, if one is are creating a target adapter, one must specify the sources from which the adapter is to be used to receive messages. If one is creating a reply adapter, furthermore, one must specify the requesters (i.e., transformers) to which the adapter is to be used to send reply messages.

One must finally specify delivery options (e.g., message lifetime) for the adapter's messages. However, before one can create an adapter, the agent service that is to host the adapter must exist on the administration console 160. For example, before one can create an EntireX Broker adapter, the agent service for the EntireX Broker must exist. If one wants to also specify source, target, or requester objects for an adapter using the adapter wizard, those objects must exist before one opens the adapter wizard.

Referring again to FIGS. 4(*a*) and 4(*b*), agent-adapters 200 interface with the application resources on one side and the infrastructure of system 100 on the other. On the one hand, the adapter half of each agent-adapter 200 uses the API of its particular application resource, or any other published interface mechanism. On the other hand, the agent side conforms to the event and messaging model of system 100 as described in greater detail herein below. In combination, the agent and adapter mediate the differences in interface protocols and data structures, providing a uniform, normalized view of the business events that they publish and consume.

Unlike other application integration solutions, the extensible design of the adapter architecture provides—the ability to seamlessly accommodate change to application interfaces, while still supporting the current set of basic interfaces. This is particularly important with systems that are already in production. For instance, a packaged application having a basic set of interfaces A' which are supported by a particular version of agent-adapter 200. If a newer version of the application incorporates a newer set of interfaces A", the user may choose to simultaneously adapt to the older interfaces A' for the production environment, while adapting to A" for a pre-production environment in order to test the new interfaces. With this facility, incremental change into the integration environment can be negotiated seamlessly.

Every component of system 100 is distributable across all supported platforms agent-adapters 200 flexibly extend this to the participating applications. Key components of system 100 (e.g. agent-adapters 200 or Integration Server 26) can, thus, be co-located with applications, or accessed remotely, or both. Numerous deployment configurations are possible—the environment is optimized to balance availability, performance and administration requirements.

Many standard adapters 200 are supplied with system 100, including SAP, MQSeries, ENTIRE Broker, RDBMS & CICS. As such, the adapters 200 support rapid deployment and easy integration of these information resources. They also reduce training and skills required. The ADK 130, including all of its automation wizards templates, provides high productivity. It is adaptable to any user's IDEs, and it facilitates customizing supplied adapters and developing custom interfaces. The adapters 200 are made up of popular language and interface bindings, including C++, Java, EJB, CORBA, COM, and Natural. In such a manner, they plug into any user's environment and tools. They leverages in-house language expertise, and they are adaptable to complex resource interface requirements. The agent-adapter architecture according to the present invention, thus, provides a robust facility supporting far more than simplistic interfaces. It ensures a uniform event across the resource portfolio.

The agent-adapter subsystem comprises the runtime interface modules that connect external applications to the EAI. On the adapter side, it is the physical interface to the external application. The agent side acts as a host for the adapter, manages resources and publishes events on behalf of the adapter.

EAI agent-adapters combine the notion of autonomous agents with adapter technology. The agent component acts as an independent software process that hosts the adaptive technology. It encapsulates sophisticated functionality such as store and forward caching, filtering, resource pooling, scheduling and dispatching. A primary advantage of the agent component is its ability to host complex business logic in order to maintain state status and negotiate transactions with the external application. This is called conversation mode processing and is particularly critical when integrating with transactional systems. Often the data elements required for brokering are deeply nested within sub-transactions and can only be retrieved by engaging in a "conversation" with the transactional system. The "primitive" adapters of the prior art do not address this problem in the complex behavior of transactional systems.

The adapter component uses the resource API. The agent component conforms to the EAI event and messaging model. In combination, the agent and adapter mediate the differences in interface protocols and data structures, providing a uniform, normalized view of the business events that they publish and consume.

Unlike other application integration solutions, the extensible design of the agent-adapter subsystem of the present invention provides the ability to seamlessly accommodate change to application interfaces, while supporting the basic interfaces. This is particularly important with systems that are already in production. For instance, a packaged application has a basic set of interfaces A', which are supported by a particular version of an agent-adapter. If a new version of the application incorporates a new set of interfaces A", the user may choose to simultaneously adapt the older interfaces for the production environment while adapting the A" interfaces for a new pre-production environment in order to test the new interfaces. The present invention, with its incremental change facility, can negotiate this function seamlessly. Every component of the EAI system is capable of being distributed across all supported platforms. Agent-adapters flexibly extend this to the participating applications. Agent-adapters can be co-located with the applications or be accessed remotely or a combination thereof in order to optimize the environment to balance availability, performance and administrative requirements.

The EAI adapters provide communication to third party (external) application packages. There are currently four basic types of message processing supported by any given adapter. Each type of processing is implemented within its own JAVA Class. These classes will serve as base classes to be extended by an application specific implementation.

The basic types of communication used by the adapter do not rely on the underlying messaging semantics implemented by the node/agent. They could be used over either pub/sub or point to point protocols without affecting the adapter behavior. The agent will make this determination based on its configuration definitions.

The base adapter classes within system 100 are as follows. The "Adapter Main" class provides the ability for the adapter to start itself and process its configuration definitions. It is also responsible for instantiating instances of the classes to be used by the four possible types of adapter communications. The "Adapter Receiver" class provides the ability for the adapter to receive a document from EAI and pass it on to the third party package. The "Adapter Sender"

class provides the ability for the adapter to receive a document from a third party package and pass it on to EAI. The "Adapter Responder" class provides the ability for the adapter to receive a document from EAI, pass it on to a third party package, receive a response from the third party package and return the response to the EAI for processing. The "Adapter Requestor" class provides the ability for the Adapter to receive a document from a third party package, pass it on to EAI for processing, receive a response from EAI and return the response to the third party package.

The EAI agent-adapter interface according to the present invention is realized by the adapter implementing several JAVA interfaces, while the adapter to agent interface is realized by the adapter using known methods of the node/agent components.

According to still another important aspect of the present invention, every adapter must implement the following interface. For the AdapterBridge, the method:

initialize(Agent-adapterConfig)

is invoked by the agent during initialization and used by the adapter to bootstrap itself. The adapter bridge is within the method that the adapter 220, 22, 224 must query the agent 210 to determine what document definitions are to be processed and the type of processing provided for each document. This is accomplished using the following agent methods:

GetSendDocumentDefinitions( )

getReceiveDocumentDefinitions( )

getRequestDocumentDefinitions( )

getResponseDocumentDefinitions( )

This method will then parse the AdapterConfiguration document to locate the subsection pertaining to the specific document definition, harbor the document specific configuration information and create an instance of a specific class based on processing type (send, receive, request or response). It will subsequently either start a Thread(Send or Request types), issue the Agent.setReceiveListener( )(Receive type) or issue the Agent.setResponseListener( )(Response type) to register the agent callbacks to be invoked when a message arrives.

The restart ( ) method is invoked by the agent 220, 222, 224 to cause the adapter 210 to terminate all activity, reload configuration data and restart itself. The shutdown ( ) method is invoked by the agent 220, 222, 224 during termination processing.

The following interfaces are also implemented by the adapters 200 as described herein below. For the ReceiveListener interface, an onReceiveMessage(ReceiveData)

method is invoked by the agent 210 on receipt of a JMS message, and he agent will pass the document on to the adapter for processing. This processing will occur under control of the JMS session thread. The adapter processing will basically consist of a one way routing of the document to the third party software application using the interfaces provided by the application. It should be noted, however, that there is no reply expected from the application on this type of call. The adapter 220, 222, 224 will be expecting only a success or failure response from the application. If EAI is expecting an actual response from the third party system, the ResponseListener interface should be used instead.

For the SendListener interface, an onSendTimerEvent(SendData)

method is invoked by the agent 210 if the adapter 220, 222, 224 is utilizing the timer feature of the node/agent. This feature is useful when the third party interface has no way to implement an event driven notification for documents to be sent to EAI for processing.

For the RequestListener interface, an onRequestTimerEvent(RequestData)

method is invoked by the agent 210 if the adapter 220, 222, 224 is utilizing the timer feature of the node/agent. This feature is useful when the third party interface has no way to implement an event driven notification for documents to be sent to EAI for processing. It should be noted at this juncture, however, that the RequestListener interface differs from the SendListener interface, in that it will send the document to EAI and wait for a document in response. This response will then be passed back to the third party system.

For the ResponseListener interface, an onResponseMessage(ResponseData)

method is invoked by the agent 210 on receipt of a JMS message, and the agent 210 will pass the document on to the adapter 220, 222, 224 for processing. This processing will occur under control of the JMS session thread. The adapter processing will consist of routing of the document to the third party software application using the interfaces provided by the application and then sending the response back into the EAI system 100 for additional processing. However, if the EAI system 100 is not expecting an actual response from the third party system the ReceiveListener interface should be used instead.

The examples shown and described herein above are not meant to limit the scope of the invention. Accordingly, modifications and variations according to the present invention will become apparent to those of ordinary skill in the art, without departing from the spirit and scope of the appended claims.

Appendix

Operators

The following table generally describes all of the currently contemplated system operators, which a user can use to build expressions for message definitions, transformer definitions, and filter definitions. System 100 supports these operators.

| Operator | Description |
| --- | --- |
| && | Logical "and" |
| \|\| | Logical "or" |
| ! | Logical "not" |
| = | Assignment |
| == | Logical "equal" |
| != | Logical "not equal" |
| + | Unary plus |
| − | Unary minus |
| * | Multiplication |
| / | Division |
| < | Less than |
| <= | Less than or equal to |
| > | Greater than |
| >= | Greater than or equal to |

Functions

The table following on the next page generally describes all of the currently contemplated system functions, which a user can use to build expressions for validating or filtering messages and transforming message data. Each description includes what the function does, the parameters it requires, and the value it returns.

When transforming message data, the user typically uses these functions to take message item values from input messages and create message item values for output messages. When validating or filtering messages, the user usually uses these functions to create boolean expressions. The parameter values for these functions can either be message items or constant (i.e., literal) values.

| Data Type | Literal Examples |
|---|---|
| Integer | 1234, 0xFF, 077, −1234 |
| Long | 1234, 1234L, −0xFF, 077L |
| Double | 12.34 |
| String | "Sagavista" |
| Boolean | true or false |
| BigDecimal | 12.34a, where "a" means arbitrary precision |
| Calendar | #DATE(2000, 2, 13) |
| | #DATE_TIME(2000, 2, 13, 23, 59) |
| | #DATE_FORMAT("M/d/yyyy", "2/13/2000") |

The system 100 also provides the functions described below, although a user can write the user's own functions for use with system 100.

| Function | Description |
|---|---|
| addToDate | Adds a specified number of days to a Calendar object date and returns the resulting Calendar object date |
| bigDecimalToBoolean | Converts a BigDecimal object to a Boolean object |
| bigDecimalToDouble | Converts a BigDecimal object to a Double object |
| bigDecimalToLong | Converts a BigDecimal object to a Long object |
| bigDecimalToString | Converts a BigDecimal object to a String object |
| booleanToBigDecimal | Converts a Boolean object to a BigDecimal object |
| booleanToLong | Converts a Boolean object to a Long object |
| booleanToString | Converts a Boolean object to a String object |
| calendarToString | Converts a Calendar object to a String object |
| compareDates | Compares two Calendar object date values and indicates whether the first date is less than, equal to, or greater than the second date |
| doubleToBigDecimal | Converts a Double object to a BigDecimal object |
| doubleToLong | Converts a Double object to a Long object |
| doubleToString | Converts a Double object to a String object |
| findString | Searches for a String object within another String object and returns the position of the found String's first character within the other String |
| findWord | Searches for a word within a String object and returns the position of the word's first character within the String |
| foundString | Searches for a String object within another String object and returns a Boolean object |
| foundWord | Searches for a word within a String object and returns a Boolean object |
| getDate | Finds the date in a Calendar object and returns the month as an Integer object |
| getMonth | Finds the month in a Calendar object and returns the month as an Integer object |
| getYear | Finds the year in a Calendar object and returns the year as an Integer object |
| getTokenAt | Parses a String object into tokens, finds a particular token, and returns the token as a String object |
| integerToString | Converts an Integer object to a String object |
| isAlpha | Determines whether all characters in a String object are alphabetic and returns a Boolean object |
| isAlphaNumeric | Determines whether all characters in a String object are alphanumeric and returns a Boolean object |
| isNumeric | Determines whether all characters in a String object are numeric and returns a Boolean object |
| justifyCenter | Creates a String object of a specified length and centers another String object within it |
| justifyLeft | Creates a String object of a specified length and left justifies another String object within it |
| justifyRight | Creates a String object of a specified length and right justifies another String object within it |

-continued

| Function | Description |
|---|---|
| longToBigDecimal | Converts a Long object to a BigDecimal object |
| longToBoolean | Converts a Long object to a Boolean object |
| longToDouble | Converts a Long object to a Double object |
| longToString | Converts a Long object to a String object |
| lookup | Looks up a String object in a lookup table specified in another String object and returns the corresponding value |
| lowercase | Converts all characters in a String object to lowercase |
| replaceString | Searches a String object for a particular String object, replaces the found String object with a replacement String object, and returns the String object with the replacement String in place |
| replaceWord | Searches a String object for a particular word, replaces the found word with a replacement word, and returns the String object with the replacement word in place |
| sizeOf | Determines the size of a String object or a ByteArray object and returns the size as a Long object |
| stringToBigDecimal | Converts a String object to a BigDecimal object |
| stringToBoolean | Converts a String object to a Boolean object |
| stringToCalendar | Converts a String object to a Calendar object |
| stringToDouble | Converts a String object to a Double object |
| stringToInteger | Converts a String object to an Integer object |
| stringToLong | Converts a String object to a Long object |
| Subarray | Finds a ByteArray object within another ByteArray object and returns the found ByteArray object |
| substring | Finds a String object within another String object and returns the found String object |
| trim | Removes white space from before and after a String |
| uppercase | Converts all characters in a String object to uppercase | addToDate

This function adds a Long object that specifies a certain number of days to a Calendar object date and returns the resulting Calendar object date.

| Calendar addToDate(Calendar,Long) | |
|---|---|
| Parameter Type | Value |
| (Calendar,Long) | Date, number of days to add to the date |
| Return Type | Value |
| Calendar | Resulting date |

EXAMPLE

A message item named DatePurchased is defined as a Calendar object. For another message, the user need the value of DatePurchased plus five days in a Calendar object. The user would enter the function as follows:

addToDate (MsgDef.DatePurchased, 5)

If the value of DatePurchased were equivalent to Feb. 13, 2000, the function would return a Calendar object whose value is equivalent to Feb. 18, 2000.

bigDecimalTo Boolean

This function converts a BigDecimal object to a Boolean object.

| Boolean bigDecimalToBoolean(BigDecimal) | | |
|---|---|---|
| Parameter Type | Value | |
| (BigDecimal) Return Type | BigDecimal to convert Value | When |
| Boolean | True False | BigDecimal is any value other than 0 BigDecimal is 0 | bigDecimalToDouble

This function converts a BigDecimal object to a Double object.

| Double bigDecimalToDouble(BigDecimal) | |
|---|---|
| Parameter Type | Value |
| (BigDecimal) Return Type | BigDecimal to convert Value |
| Double | Resulting Double | bigDecimalToLong

This function converts a BigDecimal object to a Long object.

| Long bigDecimalToLong(BigDecimal) | |
|---|---|
| Parameter Type | Value |
| (BigDecimal) Return Type | BigDecimal to convert Value |
| Long | Resulting Long | bigDecimalToString

This function converts a BigDecimal object to a String object.

| String bigDecimalToString(BigDecimal) | |
|---|---|
| Parameter Type | Value |
| (BigDecimal) Return Type | BigDecimal to convert Value |
| String | Resulting String | booleanToBigDecimal

This function converts a Boolean object to a BigDecimal object.

| BigDecimal booleanToBigDecimal(Boolean) | | |
|---|---|---|
| Parameter Type | Value | |
| (Boolean) Return Type | Boolean to convert Value | When |
| BigDecimal | 1 0 | Boolean is true Boolean is false | booleanToLong

This function converts a Boolean object to a Long object.

| Long booleanToLong(Boolean) | | |
|---|---|---|
| Parameter Type | Value | |
| (Boolean) Return Type | Boolean to convert Value | When |
| Long | 1L 0L | Boolean is true Boolean is false | booleanToString

This function converts a Boolean object to a String object.

| String booleanToString(Boolean) | |
|---|---|
| Parameter Type | Value |
| (Boolean) Return Type | Boolean to convert Value |
| String | Resulting String | calendarToString

There are two versions of this function.

The following function converts a Calendar object to a String object.

| String calendarToString(Calendar) | |
|---|---|
| Parameter Type | Value |
| (Calendar) Return Type | Calendar to convert Value |
| String | Resulting String |

The following function converts a Calendar object to a String object, using a format mask to format the String object.

| String calendarToString(Calendar,String) | |
|---|---|
| Parameter Type | Value |
| (Calendar,String) | Calendar to convert, format mask |
| Return Type | Value |
| String | Resulting String, in the format specified by the mask |

EXAMPLE

A message item named DatePurchased is defined as a Calendar object. For another message, the user need the value of DatePurchased in a String object, in the format M/d/yyyy. The user would enter the function as follows:

calendarToString (MsgDef.DatePurchased, "M/d/yyyy")

If the value of DatePurchased were equivalent to Feb. 13, 2000, the function would return a String object whose value is "2/13/2000".

compareDates

This function compares two Calendar object date values and indicates whether the first date is less than, equal to, or greater than the second date.

| Long compareDates(Calendar,Calendar) | | |
|---|---|---|
| Parameter Type | Value | |
| (Calendar,Calendar) | First date to compare, second date to compare | |
| Return Type | Value | When |
| Long | −1 | First date is less than second date |
| | 0 | First date is equal to second date |
| | 1 | First date is greater than second date | doubleToBigDecimal

This function converts a Double object to a BigDecimal object.

| BigDecimal doubleToBigDecimal(Double) | |
|---|---|
| Parameter Type | Value |
| (Double) | Double to convert |
| Return Type | Value |
| BigDecimal | Resulting BigDecimal | doubleToLong

This function converts a Double object to a Long object.

| Long doubleToLong(Double) | |
|---|---|
| Parameter Type | Value |
| (Double) | Double to convert |
| Return Type | Value |
| Long | Resulting Long | doubleToString

There are two versions of this function.

The following function converts a Double object to a String object.

| String doubleToString(Double) | |
|---|---|
| Parameter Type | Value |
| (Double) | Double to convert |
| Return Type | Value |
| String | Resulting String |

The following function converts a Double object to a String object, using a format mask to format the String object.

| String doubleToString(Double,String) | |
|---|---|
| Parameter Type | Value |
| (Double,String) | Double to convert, format mask |
| Return Type | Value |
| String | Resulting String, in the format specified by the mask |

EXAMPLE

A message item named Discount is defined as a Double object. For another message, the user need the value of Discount in a String object, in the format #.##. The user would enter the function as follows:

doubleToString (MsgDef.Discount, "#.##")

If the value of Discount were 0.04531, the function would return a String object whose value is "0.05".

findString

This function searches for a String object within another String object. If the function finds the specified String object, it returns the position of the String's first character within the other String.

|  | Long findString(String,String) |  |
|---|---|---|
| Parameter Type | Value |  |
| (String,String) | String to search, String to find |  |
| Return Type | Value | When |
| Long | Position of the String's first character within the other String | String is found |
|  | −1 | String is not found | findWord

This function searches for a word within a String object. If the function finds the specified word, it returns the position of the word's first character within the String. The function can only find the word when it is bounded by white space within the String.

|  | Long findWord(String,String) |  |
|---|---|---|
| Parameter Type | Value |  |
| (String,String) | String to search, word to find |  |
| Return Type | Value | When |
| Long | Position of the Word's first character within the String | Word is found |
|  | −1 | Word is not found | foundString

This function searches for a String object within another String object and returns a Boolean object.

|  | Boolean foundString(String,String) |  |
|---|---|---|
| Parameter Type | Value |  |
| (String,String) | String to search, String to find |  |
| Return Type | Value | When |
| Boolean | True | String is found |
|  | False | String is not found | foundWord

This function searches for a word within a String object and returns a Boolean object. The function can only find the word if it is bounded by white space within the String.

|  | Boolean foundWord(String,String) |  |
|---|---|---|
| Parameter Type | Value |  |
| (String,String) | String to search, word to find |  |
| Return Type | Value | When |
| Boolean | True | Word is found |
|  | False | Word is not found | getDate

This function finds the date in a Calendar object and returns the date as an Integer object.

|  | Integer getDate(Calendar) |
|---|---|
| Parameter Type | Value |
| (Calendar) | Calendar to read |
| Return Type | Value |
| Integer | Resulting Integer, from 1 through 31 |

EXAMPLE

A message item named DatePurchased is defined as a Calendar object. For another message, the user need the date from the value of DatePurchased in an Integer object. The user would enter the function as follows:

GetDate (MsgDef.DatePurchased)

If the value of DatePurchased were equivalent to Feb. 13, 2000, the function would return an Integer object whose value is 13.

getMonth

This function finds the month in a Calendar object and returns the month as an Integer object.

|  | Integer getMonth(Calendar) |
|---|---|
| Parameter Type | Value |
| (Calendar) | Calendar to read |
| Return Type | Value |
| Integer | Resulting Integer, from 1 through 12 |

EXAMPLE

A message item named DatePurchased is defined as a Calendar object. For another message, the user need the month from the value of DatePurchased in an Integer object. The user would enter the function as follows:

getMonth (MsgDef.DatePurchased)

If the value of DatePurchased were equivalent to Feb. 13, 2000, the function would return an Integer object whose value is 2.

getTokenAt

There are two versions of this function.

The following function parses a String object into tokens, finds a particular token, and returns the token as a String object. The function assumes that a comma delimits the tokens and lets the user indicate the position of the token to return.

If the String to parse contains a null value or the specified token position is out of range, the function returns a null value.

| String getTokenAt(String,Integer) | |
|---|---|
| Parameter Type | Value |
| (String,Integer) | String to parse, position of the token to find (starting with 0) |
| Return Type | Value |
| String | Indicated token, or a null value |

The following function parses a String object into token, finds a particular token, and returns the token as a String object. The function lets the user specify the character that delimits the tokens and lets the user indicate the position of the token to find.

If the String to parse contains a null value or the specified token position is out of range, the function returns a null value.

| String getTokenAt(String,String,Integer) | |
|---|---|
| Parameter Type | Value |
| (String,String,Integer) | String to parse, delimiter, position of the token to find (starting with 0) |
| Return Type | Value |
| String | Indicated token, or a null value |

EXAMPLE (1) A message item named Date is defined as a String object that contains a date in the format M/d/yy. For another message, the user need the month from the value of Date in a String object. The user would enter the function as follows:

getTokenAt (MsgDef.Date, "/", 0)

If Date contained "2/13/00", the function would return a String object whose value is "2".

(2) A message item named Date is defined as a String object that contains a date in the format MM.dd.yy. For another message, the user need the date from the value of Date in a String object. The user would enter the function as follows:

getTokenAt (MsgDef.Date, "/", 1)

If Date contained "02.13.00", the function would return a String object whose value is "13".

(3) A message item named Date is defined as a String object that contains a date in the format M/d/yyyy. For another message, the user need the year from the value of Date in a String object. The user would enter the function as follows:

getTokenAtMonth (MsgDef.Date, "/", 2)

If Date contained "2/13/2000", the function would return a String object whose value is "2000".

getYear

This function finds the year in a Calendar object and returns the year as an Integer object.

| Integer getYear(Calendar) | |
|---|---|
| Parameter Type | Value |
| (Calendar) | Calendar to read |
| Return Type | Value |
| Integer | Resulting Integer |

EXAMPLE

A message item named DatePurchased is defined as a Calendar object. For another message, the user need the year from the value of DatePurchased in an Integer object. The user would enter the function as follows:

getYear (MsgDef.DatePurchased)

If the value of DatePurchased were equivalent to Feb. 13, 2000, the function would return an Integer object whose value is 2000.

integerToString

There are two versions of this function.

The following function converts an Integer object to a String object.

| String integerToString(Integer) | |
|---|---|
| Parameter Type | Value |
| (Integer) | Integer to convert |
| Return Type | Value |
| String | Resulting String |

The following function converts an Integer object to a String object, using a format mask to format the String object.

| String integerToString(Integer,String) | |
|---|---|
| Parameter Type | Value |
| (Integer,String) | Integer to convert, format mask |
| Return Type | Value |
| String | Resulting String, in the format specified by the mask |

EXAMPLE

A message item named Quantity is defined as an Integer object. For another message, the user need the value of Quantity in a String object, in the format #,###. The user would enter the function as follows:

IntegerToString (MsgDef.Quantity, "#,###")

If the value of Quantity were 2500, the function would return a String object whose value is "2,500".

isAlpha

This function determines whether all characters in a String object are alphabetic and returns a Boolean object.

| Boolean isAlpha(String) | | |
|---|---|---|
| Parameter Type | Value | |
| (String) | String to check | |
| Return Type | Value | When |
| Boolean | True | All characters are alphabetic |
| | False | Not all character are alphabetic | isAlphaNumeric

This function determines whether all characters in a String object are alphanumeric and returns a Boolean object.

| Boolean isAlphaNumeric(String) | | |
|---|---|---|
| Parameter Type | Value | |
| (String) | String to check | |
| Return Type | Value | When |
| Boolean | True | All characters are alphanumeric |
| | False | Not all character are alphanumeric | isNumeric

This function determines whether all characters in a String object are numeric and returns a Boolean object.

| Boolean isNumeric(String) | | |
|---|---|---|
| Parameter Type | Value | |
| (String) | String to check | |
| Return Type | Value | When |
| Boolean | True | All characters are numeric |
| | False | Not all character are numeric | justifyCenter

There are two versions of this function.

The following function creates a String object of the length indicated by an Integer object and centers a String object within it. If the centered String is shorter than the specified length, the function pads the String on each side with an equal number of spaces.

If the centered String is longer than the specified length, the function returns a null value.

| String justifyCenter(String,Integer) | |
|---|---|
| Parameter Type | Value |
| (String,Integer) | String to center, length of the String to return |
| Return Type | Value |
| String | Resulting String, or a null value |

The following function creates a String object of the length indicated by an Integer object and centers a String object within it. If the centered String is shorter than the specified length, the function pads the String on each side with an equal number of characters specified in another String.

If the centered String is longer than the specified length, the function returns a null value.

| String justifyCenter(String,Integer,String) | |
|---|---|
| Parameter Type | Value |
| (String,Integer,String) | String to center, length of the String to return, and character to use to pad the String |
| Return Type | Value |
| String | Resulting String, or a null value |

EXAMPLE

A message item named Name is defined as a String object. For another message, the user need the value of Name, centered in a String object of length 20, and padded if necessary with asterisks (*). The user would enter the function as follows:

JustifyCenter (MsgDef.Name, 20, "*")

If the value of Name were "Wolfgang A. Mozart", the function would return a String object whose value is "*Wolfgang A. Mozart*".

justifyLeft

There are two versions of this function.

The following function creates a String object of the length indicated by an Integer object and left justifies a String object within it. If the left-justified String is shorter than the specified length, the function pads the String with spaces on the right side.

If the left-justified String is longer than the specified length, the function returns a null value.

| String justifyLeft(String,Integer) | |
|---|---|
| Parameter Type | Value |
| (String,Integer) | String to left justify, length of the String to return |
| Return Type | Value |
| String | Resulting String, or a null value |

The following function creates a String object of the length indicated by an Integer object and left justifies a String object within it. If the left-justified String is shorter than the specified length, the function pads the String on the right side with characters specified in another String.

If the left justified String is longer than the specified length, the function returns a null value.

| String justifyLeft(String,Integer,String) | |
|---|---|
| Parameter Type | Value |
| (String,Integer,String) | String to left justify, length of the String to return, and character to use to pad the String |
| Return Type | Value |
| String | Resulting String, or a null value |

EXAMPLE

A message item named Name is defined as a String object. For another message, the user need the value of Name, left justified in a String object of length 20, and padded if necessary with spaces. The user would enter the function as follows:

JustifyLeft (MsgDef.Name, 20, "*")
If the value of Name were "Franz Shubert", the function would return a String object whose value is "Franz Shubert".

justifyRight

There are two versions of this function.

The following function creates a String object of the length indicated by an Integer object and right justifies a String object within it. If the right-justified String is shorter than the specified length, the function pads the String with spaces on the left side.

If the right-justified String is longer than the specified length, the function returns a null value.

| String justifyRight(String,Integer) | |
| --- | --- |
| Parameter Type | Value |
| (String,Integer) | String to right justify, length of the String to return |
| Return Type | Value |
| String | Resulting String, or a null value |

The following function creates a String object of the length indicated by an Integer object and right justifies a String object within it. If the right-justified String is shorter than the specified length, the function pads the String on the left side with characters specified in another String.

If the right-justified String is longer than the specified length, the function returns a null value.

| String justifyRight(String,Integer,String) | |
| --- | --- |
| Parameter Type | Value |
| (String,Integer,String) | String to right justify, length of the String to return, and character to use to pad the String |
| Return Type | Value |
| String | Resulting String, or a null value |

EXAMPLE

A message item named Name is defined as a String object. For another message, the user need the value of Name, right justified in a String object of length 20, and padded if necessary with asterisks (*). The user would enter the function as follows:

JustifyRight (MsgDef.Name, 20, "*")

If the value of Name were "Sergei Rachmaninoff", the function would return a String object whose value is "*Sergei Rachmaninoff".

longToBigDecimal

This function converts a Long object to a BigDecimal object.

| BigDecimal longToBigDecimal(Long) | |
| --- | --- |
| Parameter Type | Value |
| (Long) | Long to convert |
| Return Type | Value |
| BigDecimal | Resulting BigDecimal | longToBoolean

This function converts a Long object to a Boolean object.

| Boolean longToBoolean(Long) | | |
| --- | --- | --- |
| Parameter Type | Value | |
| (Long) | Long to convert | |
| Return Type | Value | When |
| Boolean | True | Long is any value other than 0 |
|  | False | Long is 0 | longToDouble

This function converts a Long object to a Double object.

| Double longToDouble(Long) | |
| --- | --- |
| Parameter Type | Value |
| (Long) | Long to convert |
| Return Type | Value |
| Double | Resulting Double | longToString

There are two versions of this function.

The following function converts a Long object to a String object.

| String longToString(Long) | |
| --- | --- |
| Parameter Type | Value |
| (Long) | Long to convert |
| Return Type | Value |
| String | Resulting String |

The following function converts a Long object to a String object, using a format mask to format the String object.

| String longToString(Long,String) | |
| --- | --- |
| Parameter Type | Value |
| (Long,String) | Long to convert, format mask |
| Return Type | Value |
| String | Resulting String, in the format specified by the mask |

EXAMPLE

A message item named CustID is defined as a Long object. For another message, the user need the value of CustID in a String object, in the format ##,###. The user would enter the function as follows:

longToString (MsgDef.CustID, "##,###")

If the value of CustID were 10321, the function would return a String object whose value is "10,321".

lookup

There are two versions of this function.

The following function looks up a String object in a lookup table specified in another String object and returns the corresponding value. If the function does not find a corresponding value in the lookup table, it returns a null value.

| String lookup(String,String) | |
| --- | --- |
| Parameter Type | Value |
| (String,String) | String to look up, lookup table |
| Return Type | Value |
| String | Value found in the lookup table, or a null value |

The following function looks up a String object in a lookup table specified in another String object and returns the corresponding value. If the function does not find a corresponding value in the lookup table, it returns a default value specified in a third String object.

| String lookup(String,String,String) | |
| --- | --- |
| Parameter Type | Value |
| (String,String, String) | String to look up, lookup table, default value |
| Return Type | Value |
| String | Value found in the lookup table, or the default value |

EXAMPLE

A message item named State is defined as a String object. State always contains a two-letter abbreviation for the name of one of three states in the United States. For another message, the user need the full name of the state in a String object. If no full name corresponds to the abbreviation, the user want the String object to contain "N/A". The user would enter the function as follows:

lookup (MsgDef.State, "MD=Maryland, PA=Pennsylvania, VA=Virginia", "N/A")

If the value of State were "VA", the function would return a String object whose value is "Virginia".

lowercase

This function converts all characters in a String object to lowercase.

| String lowercase(String) | |
| --- | --- |
| Parameter Type | Value |
| (String) | String to convert |
| Return Type | Value |
| String | Resulting String | replaceString

This function searches a String object for a particular String object, replaces the found String object with a replacement String object, and returns the String object with the replacement String in place.

If the function cannot find the String to replace, it returns the String it searched without changing it.

| String replaceString(String,String,String) | |
| --- | --- |
| Parameter Type | Value |
| (String,String,String) | String to replace, replacement String, String to search |
| Return Type | Value |
| String | String with replacement String in place |

EXAMPLE

A message item named Address is defined as a String object. For addresses in the state of Virginia, the value in Address sometimes includes the two-letter abbreviation Va. For another message, the user need a String object that contains the value of Address, but with the full name of the state substituted for the abbreviation. The user would enter the function as follows:

replaceString ("VA", "Virginia, MsgDef.Address)

If the value of Address were "Reston, Va. 20191", the function would return a String object whose value is "Reston, Va. 20191".

replaceWord

This function searches a String object for a particular word, replaces the found word with another word, and returns the String object with the replacement word in place.

The function can only find the specified word within the String object if the word is: (1) preceded and followed by white space; (2) left justified within the String object and and followed by white space; and (3) right justified within the String object and preceded by white space. If the function cannot find the word, it returns the String it searched without changing it.

| String replaceWord(String,String,String) | |
| --- | --- |
| Parameter Type | Value |
| (String,String,String) | Word to replace, replacement word, String to search |
| Return Type | Value |
| String | String with replacement word in place |

EXAMPLE

A message item named Address is defined as a String object. For addresses in the state of Maryland, the value in Address sometimes includes the two-letter abbreviation MD. For another message, the user need a String object that contains the value of Address, but with the full name of the state substituted for the abbreviation. The user would enter the function as follows:

replaceWord ("MD", "Maryland", MsgDef.Address)

If the value of Address were "Bethesda, Md. 20904", the function would return a String object whose value is "Bethesda, Md. 20904".

sizeOf

There are two versions of this function.

The following function determines the size of a String object and returns the size as a Long object.

| Long sizeOf(String) | |
|---|---|
| Parameter Type | Value |
| (String)<br>Return Type | String whose size to determine<br>Value |
| Long | Size of the String |

The following function determines the size of a ByteArray object and returns the size as a Long object.

| Long sizeOf(ByteArray) | |
|---|---|
| Parameter Type | Value |
| (ByteArray)<br>Return Type | ByteArray whose size to determine<br>Value |
| Long | Size of the ByteArray | stringToBigDecimal
This function converts a String object to a Big Decimal object.

| BigDecimal stringToBigDecimalString) | |
|---|---|
| Parameter Type | Value |
| (String)<br>Return Type | String to convert<br>Value |
| BigDecimal | Resulting BigDecimal | stringToBoolean
This function converts a String object to a Boolean object.

| Boolean stringToBoolean(String) | |
|---|---|
| Parameter Type | Value |
| (String)<br>Return Type | String to convert<br>Value |
| Boolean | Resulting Boolean | stringToCalendar
There are two versions of this function.
The following function converts a String object to a Calendar object.

| stringToCalendar(String) | |
|---|---|
| Parameter Type | Value |
| (String)<br>Return Type | String to convert<br>Value |
| Calendar | Resulting Calendar |

The following function converts a String object to a Calendar object, using a format mask to interpret the String object.

| Calendar stringToCalendar(String,String) | |
|---|---|
| Parameter Type | Value |
| (String,String)<br>Return Type | String to convert, format mask<br>Value |
| Calendar | Resulting Calendar |

EXAMPLE

A message item named DatePurchased is defined as a String object that contains a date in the format M/d/yy. For another message, the user need the Calendar equivalent of the value of DatePurchased in a Calendar object. The user would enter the function as follows:

stringToCalendar (MsgDef.DatePurchased, "M/d/yy")

If the value of DatePurchased were "2/13/00", the function would return a Calendar object whose value is the equivalent of Feb. 13, 2000.

stringToDouble

There are two versions of this function.

The following function converts a String object to a Double object.

| Double stringToDouble(String) | |
|---|---|
| Parameter Type | Value |
| (String)<br>Return Type | String to convert<br>Value |
| Double | Resulting Double |

The following function converts a String object to a Double object, using a format mask to interpret the String object.

| Double stringToDouble(String,String) | |
|---|---|
| Parameter Type | Value |
| (String,String)<br>Return Type | String to convert, format mask<br>Value |
| Double | Resulting Double |

EXAMPLE

A message item named TotalCost is defined as a String object that contains a dollar amount in the format ##,###.##. For another message, the user need the value of TotalCost in a Double object. The user would enter the function as follows:

stringToDouble (MsgDef.TotalCost, "##,###.##")

If the value of TotalCost were "5,137.29", the function would return a Double object whose value is 5137.29.

stringToInteger

There are two versions of this function.

The following function converts a String object to an Integer object.

| Integer stringToInteger(String) | |
|---|---|
| Parameter Type | Value |
| (String) | String to convert |
| Return Type | Value |
| Integer | Resulting Integer |

The following function converts a String object to an Integer object, using a format mask to interpret the String object.

| Integer stringToInteger(String,String) | |
|---|---|
| Parameter Type | Value |
| (String,String) | String to convert, format mask |
| Return Type | Value |
| Integer | Resulting Integer |

EXAMPLE

A message item named Quantity is defined as a String object that contains an amount in the format #,###. For another message, the user need the value of Quantity in a String object. The user would enter the function as follows:

stringtoInteger (MsgDef.Quantity, "#,###")

If the value of Quantity were "2,500", the function would return an Integer object whose value is 2500.

stringToLong

There are two versions of this function.

The following function converts a String object to a Long object.

| Long stringToLong(String) | |
|---|---|
| Parameter Type | Value |
| (String) | String to convert |
| Return Type | Value |
| Long | Resulting Long |

The following function converts a String object to a Long object, using a format mask to interpret the String object.

| Long stringToLong(String,String) | |
|---|---|
| Parameter Type | Value |
| (String,String) | String to convert, format mask |
| Return Type | Value |
| Long | Resulting Long |

EXAMPLE

A message item named CustID is defined as a String object that contains a number in the format ##,###. For another message, the user need the value of CustID in a Long object. The user would enter the function as follows:

stringToLong (MsgDef.CustID, "##,###")

If the value of CustID were "10,321", the function would return a Long object whose value is 10321.

subarray

This function finds a ByteArray object within another ByteArray object and returns the found ByteArray object.

If the function cannot find the ByteArray, it returns a null value.

| ByteArray subarray(Long,Long,ByteArray) | |
|---|---|
| Parameter Type | Value |
| (Long,Long,ByteArray) | Position of the first byte of the ByteArray to find, position of the last byte of the ByteArray to find, ByteArray that contains the ByteArray to find; positions start with 0; |
| Return Type | Value |
| ByteArray | ByteArray that has been found |

Example A message item named Array is defined as a ByteArray object. For another message, the user need the first eight bytes of Array in a ByteArray object. The user would enter the function as follows:

subArray (0, 7, MsgDef.Array)

substring

This function finds a String object within another String object and returns the found String object.

If the function cannot find the String, it returns a null value.

| String substring(Long,Long,String) | |
|---|---|
| Parameter Type | Value |
| (Long,Long,String) | Position of the first character of the String to find, position of the last character of the String to find, String that contains the String to find |
| Return Type | Value |
| String | String that has been found | trim

This function removes white space before and after a String object.

| String trim(String) | |
|---|---|
| Parameter Type | Value |
| (String) | String object from which to remove white space |
| Return Type | Value |
| String | Resulting String | uppercaseThis function converts all characters in a String object to uppercase.

| String uppercase(String) | |
| --- | --- |
| Parameter Type | Value |
| (String) | String to convert |
| Return Type | Value |
| String | Resulting String |

What we claim as our invention is:

1. A system for integrating a plurality of computer applications, comprising:
   an enterprise messaging system, said enterprise messaging system passing messages between said computer applications;
   a database storage system coupled to said enterprise messaging system, said database storage system storing a plurality of data transformation configurations and a plurality of rules;
   an integration service coupled to said enterprise messaging system, said integration service comprising a data transformation engine using the data transformation configurations stored in said database storage system and a rules evaluation engine using the rules stored in said database storage system;
   a plurality of agent-adapters coupled to said enterprise messaging system, each agent-adapter coupled to a respective one of said computer applications, each agent-adapter passing messages between said enterprise messaging system and said respective computer application, wherein each said agent-adapter comprises an adapter portion including an object and an agent portion encapsulating said object and each said adapter is selected from the group consisting of a source adapter, a target adapter, and a reply adapter; and
   a message schema operating in conjunction with said agent-adapters to parse individual message elements from the computer applications.

2. The system according to claim 1, wherein said enterprise messaging system passes messages between said computer applications in a publish and subscribe mode.

3. The system according to claim 1, wherein said enterprise messaging system passes messages between said computer applications in a request and reply mode.

4. The system according to claim 1, wherein said integration service system splits and combines messages received from said enterprise messaging system and performs content-based routing of messages to said computer applications.

5. The system according to claim 1, wherein each said agent-adapter translates messages being passed from said enterprise messaging system to said respective computer application from a system format to a respective computer application format, and translates messages being passed from said respective computer application to said enterprise messaging system from the respective computer application format to the system format.

6. The system according to claim 1, wherein each said agent-adapter further passes messages between other said agent-adapters and said respective computer application.

7. The system according to claim 1, further comprising a graphic user interface coupled to said enterprise messaging system, said graphic user interface providing an interface to add additional data transformation configurations and additional rules to said database storage system.

8. The system according to claim 1, further comprising a node management service coupled to said enterprise messaging system, said node management service providing start, stop, and update functionality to said system.

9. The system according to claim 1, wherein said computer applications are geographically distributed.

10. The system according to claim 1, wherein each said agent-adapter comprises an adapter portion and an agent portion encapsulating said adapter portion.

11. The system according to claim 1, wherein each said agent-adapter comprises one or more adapter portions and an agent portion encapsulating all of said one or more adapter portions.

12. The system according to claim 1, wherein said computer applications comprise one or more source applications and one or more target applications.

13. The system according to claim 12, further comprising a plurality of source adapters, each of which correspond to a respective one of said source applications, and a plurality of target adapters, each of which correspond to a respective one of said source applications.

14. The system according to claim 12, further comprising a plurality of reply adapters, each of which correspond to a respective one of said computer applications.

15. An improved enterprise application integration system including an agent-adapter for use therein, the improvement comprising:
   an adapter configured for a selected one of the enterprise applications, wherein said adapter is selected from the group consisting of a source adapter, a target adapter, and a reply adapter;
   an agent service hosting said adapter;
   a message definition for each of a plurality of messages said adapter will produce, receive, or reply to;
   means for connecting said adapter to said selected enterprise application; and
   means for implementing said adapter through said connecting means.

16. The improvement according to claim 15, wherein said adapter comprises a source adapter and further comprising means for designating selected ones of a plurality of target said source adapter is adapted to send one or more messages.

17. The improvement according to claim 15, wherein said adapter comprises a target adapter and further comprising means for designating selected ones of a plurality of sources from which said target adapter is adapted to receive one or more messages.

18. The improvement according to claim 15, wherein said adapter comprises a reply adapter and further comprising means for designating selected ones of a plurality of requesters to which said reply adapter is adapted to send one or more reply messages.

19. The improvement according to claim 18, wherein each said requester comprises a transformer.

20. The improvement according to claim 15, wherein said implementation means further comprises means for extracting said message definition of said adapter.

21. The improvement according to claim 15, further comprising means for designating selected ones of a plurality of delivery options for messages associated with said adapter.

22. The improvement according to claim 21, wherein said plurality of delivery options includes a parameter indicative of a lifetime for each said associated message.

23. A method for passing messages between a first computer application and a second computer application, comprising the steps of:

provide a first message having a first data from said first computer application;

publishing said first message to obtain a first published message;

converting said first data of said first published message to a second data to obtain a second message;

publishing said second message to obtain a second published message; providing said second published message to said second computer application, providing an adapter configured for a selected one of said computer applications, wherein said adapter is selected from the group consisting of a source adapter, a target adapter, and a reply adapter;

providing an agent service to host said adapter;

defining a message definition for each of a plurality of messages said adapter will produce, receive, or reply to; and connecting said adapter to selected computer application.

24. The method according to claim 23, further comprising the steps of:

translating said first message from a first computer application format to a system format prior to publishing said first message; and translating said second published message from said system format to a second computer application format prior to providing said second published message to said second computer application.

25. The method according to 23, wherein said step of converting said first data comprises:

requesting said second data from a database; and receiving said second data from said database.

26. A system for integrating a plurality of computer applications, comprising;

means for routing a plurality of messages within the system;

means for storing a plurality of data transformation configurations and plurality of rules;

means for applying said data transformation configurations to said plurality of messages;

means for applying said rules to said plurality of messages; and means for routing said plurality of messages between said means for routing messages within the system and the plurality of computer applications;

wherein said routing means includes dedicated means for routing selected ones of said plurality of messages for respective ones of the plurality of computer applications, including:

an adapter configured for each of the plurality of computer applications wherein said adapter is selected from the group consisting of a source adapter, a target adapter, and a reply adapter;

an agent service hosting said adapter;

a message definition for each of said plurality of messages said adapter will produce, receive, or reply to;

means for connecting said adapter to its respective computer application; and means for implementing said adapter through said connecting means.

* * * * *